United States Patent
Park et al.

(10) Patent No.: US 12,481,435 B2
(45) Date of Patent: Nov. 25, 2025

(54) FIELD PROGRAMMABLE GATE ARRAY DEVICE INCLUDING SPIN ORBIT TORQUE-MAGNETIC RANDOM ACCESS MEMORY AND OPERATING METHOD THEREOF

(71) Applicant: Samsung Electronics Co., Ltd., Suwon-si (KR)

(72) Inventors: Jongsun Park, Seoul (KR); Dongsu Kim, Seoul (KR); Seonggeon Park, Suwon-si (KR)

(73) Assignees: Samsung Electronics Co., Ltd., Gyeonggi-do (KR); Korea University Research and Business Foundation, Seoul (KR)

( * ) Notice: Subject to any disclaimer, the term of this patent is extended or adjusted under 35 U.S.C. 154(b) by 25 days.

(21) Appl. No.: 18/440,618

(22) Filed: Feb. 13, 2024

(65) Prior Publication Data

US 2025/0028458 A1    Jan. 23, 2025

(30) Foreign Application Priority Data

Jul. 20, 2023   (KR) .................. 10-2023-0094560

(51) Int. Cl.
*G06F 3/06* (2006.01)
*G11C 11/16* (2006.01)
*H03K 19/17728* (2020.01)

(52) U.S. Cl.
CPC .......... *G06F 3/0625* (2013.01); *G06F 3/0659* (2013.01); *G06F 3/0673* (2013.01); *G11C 11/161* (2013.01); *G11C 11/1659* (2013.01); *G11C 11/1673* (2013.01); *G11C 11/1675* (2013.01); *H03K 19/17728* (2013.01)

(58) Field of Classification Search
None
See application file for complete search history.

(56) References Cited

U.S. PATENT DOCUMENTS

| | | | |
|---|---|---|---|
| 8,581,623 B2 | 11/2013 | Fukuda | |
| 8,908,408 B2 | 12/2014 | Tatsumura et al. | |
| 10,224,368 B2 | 3/2019 | Li et al. | |
| 11,309,334 B2 | 4/2022 | Lin et al. | |
| 11,610,615 B2 | 3/2023 | Hanyu et al. | |
| 2014/0035617 A1* | 2/2014 | Raychowdhury | H03K 19/177 326/39 |

(Continued)

*Primary Examiner* — Crystal L Hammond
(74) *Attorney, Agent, or Firm* — Harness, Dickey & Pierce, P.L.C.

(57) ABSTRACT

Disclosed is a field programmable gate array device including a plurality of lookup tables each storing data. Each lookup table includes a cell array including cells connected to a plurality of word lines, a drive circuit connected to the cell array through the plurality of word lines, and a peripheral circuit connected to the cell array through a plurality of bit lines and source lines, and configured to control the drive circuit. The drive circuit drives a first word line among the word lines based on first input signals. The peripheral circuit performs a data write operation on a first cell connected to the first word line, based on a first command and a second input signal, and performs a data read operation on the first cell connected to the first word line, based on a second command and the second input signal.

20 Claims, 26 Drawing Sheets

(56) References Cited

U.S. PATENT DOCUMENTS

| | | | |
|---|---|---|---|
| 2014/0286087 A1* | 9/2014 | Fujita | G11C 11/1653 365/158 |
| 2022/0208244 A1 | 6/2022 | Song et al. | |
| 2023/0095330 A1 | 3/2023 | Lee et al. | |

* cited by examiner

FIG. 9C

| | Read Operation | |
|---|---|---|
| | Cell1 | Cell2 |
| BL1 | SA | - |
| BL2 | - | SA |
| BL3 | VSS | VSS |
| SL1 | - | - |
| SL2 | - | - |

FIG. 10C

| Write Operation | | |
|---|---|---|
| Data '0' | | |
|  | Cell1 | Cell2 |
| BL1 | – | – |
| BL2 | – | – |
| BL3 | VDD | VDD |
| SL1 | VSS | VDD |
| SL2 | VDD | VSS |

FIG. 11C

| Write Operation | | |
|---|---|---|
| Data '1' | | |
|  | Cell1 | Cell2 |
| BL1 | − | − |
| BL2 | − | − |
| BL3 | VSS | VSS |
| SL1 | VDD | VSS |
| SL2 | VSS | VDD |

FIELD PROGRAMMABLE GATE ARRAY DEVICE INCLUDING SPIN ORBIT TORQUE-MAGNETIC RANDOM ACCESS MEMORY AND OPERATING METHOD THEREOF

CROSS-REFERENCE TO RELATED APPLICATIONS

This application claims priority under 35 U.S.C. § 119 to Korean Patent Application No. 10-2023-0094560 filed on Jul. 20, 2023, in the Korean Intellectual Property Office, the disclosures of which are incorporated by reference herein in their entireties.

BACKGROUND

Embodiments of the present disclosure described herein relate to an electronic device, and more particularly, relate to a field programmable gate array device (FPGA) including a spin orbit torque-magnetic random access memory (SOT-MRAM) and an operating method thereof.

A FPGA is a semiconductor device that includes a programmable metal wiring and a programmable logic element such that a desired function may be implemented in the field.

The programmable logic element included in the FPGA includes a lookup table configured for storing, in advance, processing results of data input to the FPGA. This lookup table includes a plurality of cells each including a semiconductor memory device.

As the FPGA requires a high-speed operation and/or a low operating voltage, the lookup table includes a magnetic memory element as a semiconductor memory device. For example, the lookup table may include a SOT-MRAM as a magnetic memory element.

Depending on how the cells included in the lookup table are designed, the area of the lookup table may increase significantly, thereby causing an increase in the time taken to read the processing result from the lookup table. Further, because the lookup table occupies a significant portion of the total area of the FPGA, a way to change the design of the cells included in the lookup table such that the area of the FPGA is reduced and a time taken to read the processing result from the FPGA decreases would be beneficial.

SUMMARY

Embodiments of the present disclosure provide a field programmable gate array device capable of providing a lookup table with the small area while including an SOT-MRAM and an operating method thereof.

According to an embodiment, a field programmable gate array device includes a plurality of lookup tables each configured to store data. Each of the plurality of lookup tables includes a cell array including a plurality of cells connected to a plurality of word lines, a drive circuit connected to the cell array through the plurality of word lines and configured to drive at least a first word line, among the plurality of word lines, based on first input signals received from an external device, and a peripheral circuit connected to the cell array through a plurality of bit lines and a plurality of source lines, and configured to control the drive circuit. The peripheral circuit performs a data write operation on a first cell among cells connected to the first word line from among the plurality of cells, based on a first command and a second input signal received from an external device, and performs a data read operation on the first cell among the cells connected to the first word line from among the plurality of cells, based on a second command and the second input signal received from the external device. Each of the cells connected to the first word line is connected to two of the plurality of bit lines and one of the plurality of source lines.

According to an embodiment, an operating method of a field programmable gate array device which includes a cell array including a plurality of cells, a drive circuit connected to the cell array through a plurality of word lines, and a peripheral circuit connected to the cell array through a plurality of bit lines and a plurality of source lines and controlling the drive circuit includes receiving, at the drive circuit, first input signals from an external device, driving, at the drive circuit, a first word line among the plurality of word lines based on the first input signals, receiving, at the drive circuit, a command, an address, and a second input signal from the external device, and performing, at the peripheral circuit, a data read operation on a first cell among cells connected to the first word line from among the plurality of cells, based on the command and the second input signal. Each of the cells connected to the first word line is connected to two of the plurality of bit lines and one of the plurality of source lines.

According to an embodiment, an operating method of a field programmable gate array device which includes a cell array including a plurality of cells, a drive circuit connected to the cell array through a plurality of word lines, and a peripheral circuit connected to the cell array through a plurality of bit lines and a plurality of source lines and controlling the drive circuit includes receiving, at the drive circuit, first input signals from an external device, driving, at the drive circuit, a first word line among the plurality of word lines based on the first input signals, receiving, at the peripheral circuit, a write command, a write address, write data, and a second input signal from the external device, writing, at the peripheral circuit, the write data to a first cell among cells connected to the first word line from among the plurality of cells, based on the write command and the second input signal, receiving, at the peripheral circuit, a read command, a read address, and the second input signal from the external device, and reading, at the peripheral circuit, a second cell among the cells connected to the first word line from among the plurality of cells, based on the read command and the second input signal. The writing of the write data includes performing, at the peripheral circuit, first logical operations with respect to the second input signal and a write enable signal, applying, at the peripheral circuit, different voltages to the plurality of source lines based on the first input signals and the second input signal, and writing, at the peripheral circuit, the write data to the first cell of the plurality of cells based on the voltages and a result of the first logical operations. The write enable signal is generated by the peripheral circuit in response to the write command. The reading of the second cell among the cells connected to the first word line from among the plurality of cells includes performing, at the peripheral circuit, second logical operations with respect to the second input signal and the read command, and sensing, at the peripheral circuit, a voltage change of a bit line, which is connected to the second cell among the plurality of cells, from among the plurality of bit lines based on a result of the second logical operations. The read enable signal is generated by the peripheral circuit in response to the read command, and each of the cells connected to the first word line is connected to two of the plurality of bit lines and one of the plurality of source lines.

BRIEF DESCRIPTION OF THE FIGURES

The above and other objects and features of the present disclosure will become apparent by describing in detail embodiments thereof with reference to the accompanying drawings.

FIGS. 9A to 9C are diagrams for describing a data read operation associated with cells connected to one word line of FIG. 6, according to at least one embodiment of the present disclosure.

DETAILED DESCRIPTION

Figure 1A:
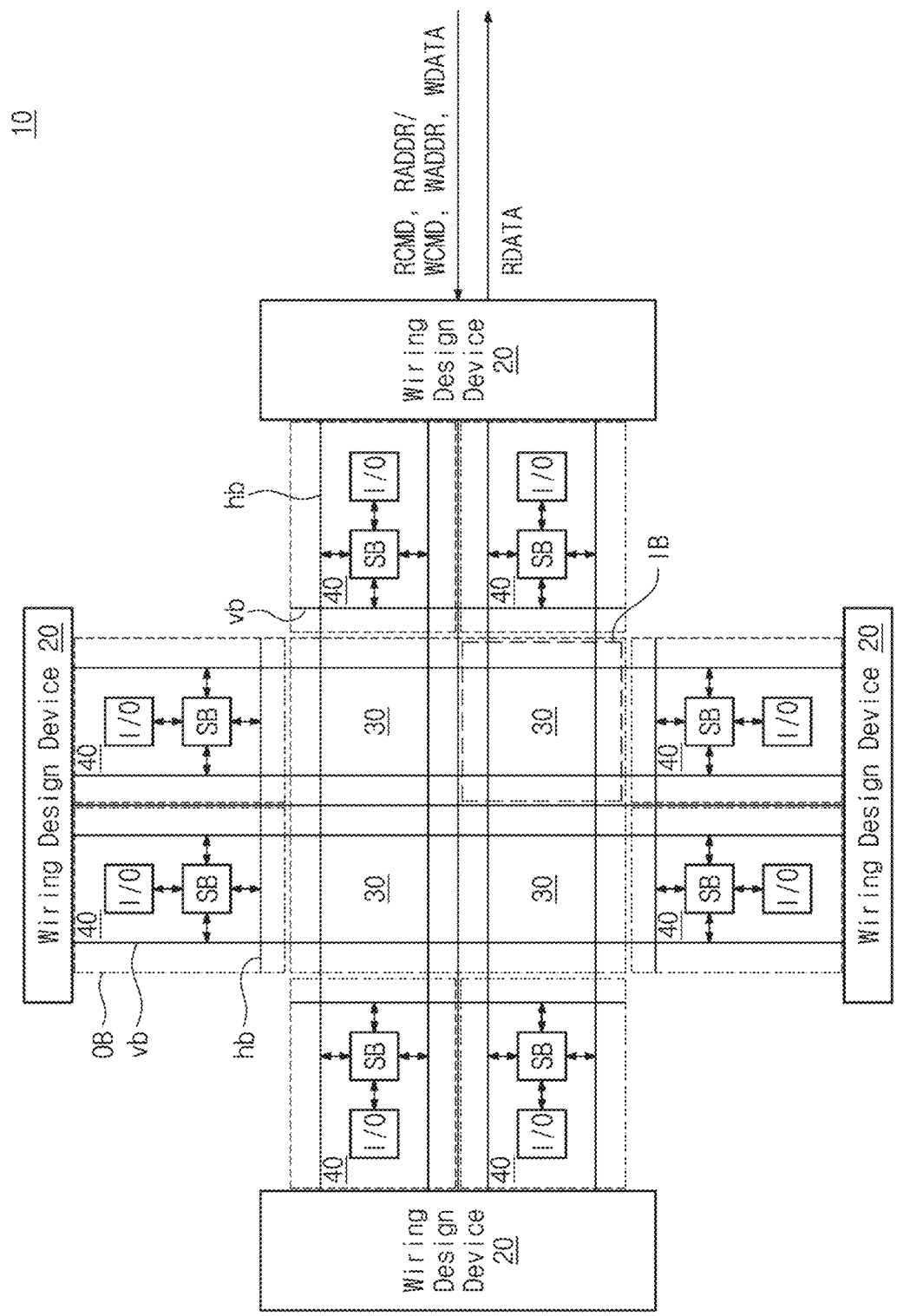
FIGS. 1A and 1B are diagrams illustrating a field programmable gate array (FPGA) device according to at least one embodiment of the present disclosure.

Below, embodiments of the present disclosure will be described in detail and clearly to such an extent that an ordinary one in the art easily carries out the present disclosure. In the drawings, like reference numerals denote like elements and the sizes of the elements may be exaggerated for clarity and convenience of description. Also, the embodiments described below are only examples and various modifications may be made from such embodiments.

Additionally, spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, device may be otherwise oriented, for example, rotated 90 degrees or at other orientations, and the spatially relative descriptors used herein should be interpreted accordingly.

Figure 1B:
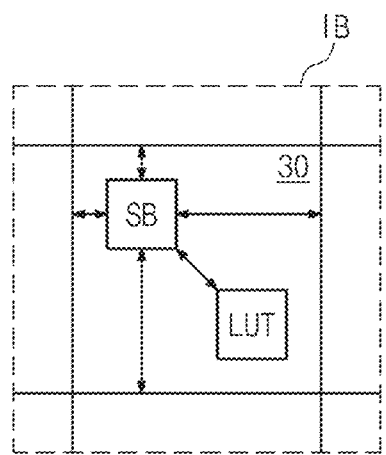

FIGS. 1A and 1B are diagrams illustrating a field programmable gate array (FPGA) device according to at least one embodiment of the present disclosure. Referring to FIGS. 1A and 1B, an FPGA device 10 may include a plurality of wiring design devices 20, a plurality of inner blocks 30, and a plurality of outer blocks 40.

The plurality of wiring design devices 20 may form a wiring structure implementing a connection relationship between the plurality of inner blocks 30 and the plurality of outer blocks 40 included in the FPGA device 10. For example, the plurality of wiring design devices 20 may enable the formation of communication paths connecting the plurality of inner blocks 30 and the plurality of outer blocks 40 included in the FPGA device 10. An example in which the number of wiring design devices 20 is "4" is illustrated in FIGS. 1A and 1B, but the number of wiring design devices 20 is not limited thereto.

The plurality of wiring design devices 20 may include connection information of switch boxes SB therein. For example, the plurality of wiring design devices 20 may implement a connection relationship between the plurality of inner blocks (IB) 30 and the plurality of outer blocks (OB) 40 based on the connection information of the switch boxes SB.

Each of the plurality of inner blocks 30 and the plurality of outer blocks 40 may include a plurality of horizontal bundles hb and a plurality of vertical bundles vb. Each of the plurality of horizontal bundles hb and the plurality of vertical bundles vb may include a wiring pattern.

The wiring pattern may be a pattern such as a single wiring pattern, a dual wiring pattern, a hex wiring pattern, a complex wiring pattern, and/or the like. The plurality of inner blocks 30 and the plurality of outer blocks 40 may be connected to each other through the wiring patterns based on the connection information of the switch boxes SB. Each of the plurality of wiring design devices 20 may be electrically connected to the plurality of vertical bundles vb included in two outer blocks OB.

Each of the inner blocks 30 may further include a switch box SB and a lookup table LUT in addition to the plurality of vertical bundles vb and the plurality of horizontal bundles hb. An example in which the number of inner blocks 30 is "4" is illustrated in FIGS. 1A and 1B, but the number of inner blocks 30 is not limited thereto.

Each of the plurality of outer blocks 40 may further include an input/output block I/O and a switch box SB in addition to the plurality of vertical bundles vb and the plurality of horizontal bundles hb. The FPGA device 10 may perform an input/output with the outside (e.g., with an external device (not illustrated)) through the input/output block I/O. An example in which the number of outer blocks 40 is "8" is illustrated in FIGS. 1A and 1B, but the number of outer blocks 40 is not limited thereto.

The switch box SB may include a plurality of switches. The switch box SB is configured to receive connection information of switches from the plurality of wiring design devices 20. The switch box SB may be electrically connected to the input/output block I/O, the lookup table LUT, the plurality of horizontal bundles hb, and the plurality of vertical bundles vb by using the plurality of switches, based on the received switch connection information.

The FPGA device 10 is configured to receive a read command RCMD, a read address RADDR, a write command WCMD, a write address WADDR, and write data WDATA from the outside; and the FPGA device 10 is configured to output read data RDATA to the outside. For example, the FPGA device 10 may be configured to be connected to processing circuitry configured to enable the FPGA device 10 reading and/or writing operations. The processing circuitry may include, e.g., hardware, software, and/or a combination thereof. For example, the processing circuitry more specifically may include (and/or be included in), but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

For example, the FPGA device 10 is configured to receive the read command RCMD, the read address RADDR, the write command WCMD, the write address WADDR, and the write data WDATA from an FPGA controller (not illustrated) located outside the FPGA device 10 and is configured to output the read data RDATA to the FPGA controller.

Figure 2:
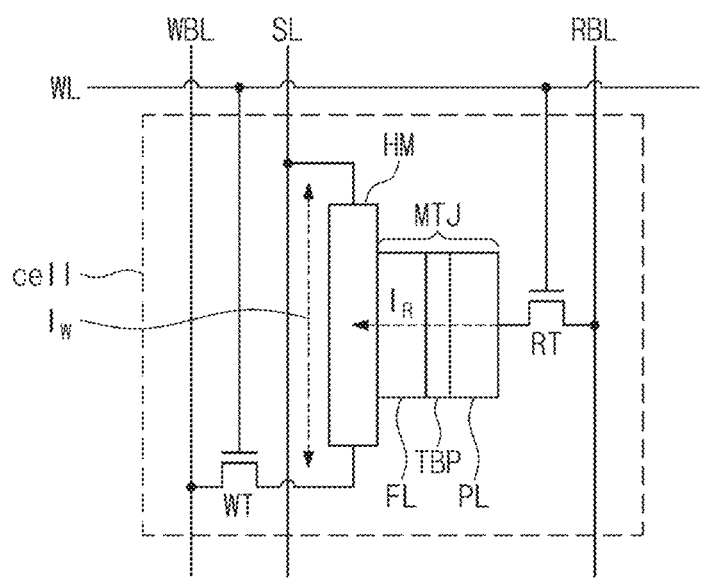
FIG. 2 is a diagram illustrating one cell included in an FPGA device in detail.
Figure 2:
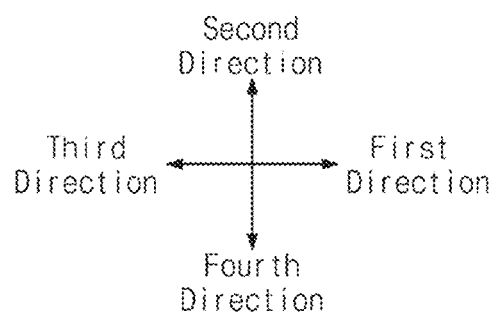

FIG. 2 is a diagram illustrating one cell included in an FPGA device in detail. For example, each of the and/or at least one of the plurality of lookup tables LUT included in the FPGA device 10 of FIG. 1A may include a plurality of the illustrated cell. In at least one embodiment, in FIG. 2 the description will be given with reference to one cell, and functions and operations of the remaining cells may be similar to a function and an operation of the cell.

Referring to FIG. 2, the cell may include a read transistor RT, a write transistor WT, and a memory, such as a spin orbit torque-magnetic random access memory (hereinafter referred to as an "SOT-MRAM"). The SOT-MRAM may include a heavy metal HM and a magnetic tunnel junction (hereinafter referred to as an "MTJ") and may be referred to as comprising a heavy metal magnetic tunnel junction structure ("HM-MTJ" or "MTJ-HM").

A first end portion of the heavy metal HM may be connected to a first source/drain terminal of the write transistor WT, and a second end portion of the heavy metal HM may be connected to a source line SL. The MTJ may be disposed on the heavy metal HM between the first end portion and the second end portion.

The heavy metal HM may be and/or include a semiconductor substrate containing silicon, silicon on insulator (SOI), silicon germanium (SiGe), germanium (Ge), gallium arsenide (GaAs), etc.

The MTJ may include a reference magnetic pattern PL, a free magnetic pattern FL, and a tunnel barrier pattern TBP interposed therebetween.

The free magnetic pattern FL may be interposed between the heavy metal HM and the tunnel barrier pattern TBP. The free magnetic pattern FL may be disposed to face a first direction from the heavy metal HM and may contact one surface of the heavy metal HM.

The free magnetic pattern FL may include a magnetic material configured to induce magnetic anisotropy at the interface of the free magnetic pattern FL and the tunnel barrier pattern TBP. For example, the free magnetic pattern FL may include cobalt-iron-boron (CoFeB).

The tunnel barrier pattern TBP may be interposed between the free magnetic pattern FL and the reference magnetic pattern PL. The tunnel barrier pattern TBP may be disposed to face the first direction from the free magnetic pattern FL and may contact one surface of the free magnetic pattern FL.

The tunnel barrier pattern TBP may include an insulator oxide, for example, at least one of magnesium (Mg) oxide, titanium (Ti) oxide, aluminum (Al) oxide, magnesium-zinc (Mg—Zn) oxide, magnesium-boron (Mg—B) oxide, and/or the like.

The reference magnetic pattern PL may be spaced from the free magnetic pattern FL, with the tunnel barrier pattern TBP interposed therebetween. The reference magnetic pattern PL may be disposed to face the first direction from the tunnel barrier pattern TBP and may contact one surface of the tunnel barrier pattern TBP.

In at least one embodiment, the reference magnetic pattern PL may include cobalt (Co), platinum (Pt), and a first non-magnetic element. The first non-magnetic element may include at least one of Nb, Cr, Mo, W, Zr, Hf, and Ti.

The cell may be configured such that when an in-plane current flows in the heavy metal HM, a spin orbit torque SOT induced by the spin hall effect or Rashba effect may be applied to the free magnetic pattern FL, and thus, a magnetization direction of the free magnetic pattern FL may be switched.

The MTJ may be interposed between the first source/drain terminal of the read transistor RT and the heavy metal HM and may be connected to the first source/drain terminal of the read transistor RT.

A second source/drain terminal of the write transistor WT may be connected to a write bit line WBL, and a second source/drain terminal of the read transistor RT may be connected to a read bit line RBL.

The read transistor RT may be connected between the MTJ and the read bit line RBL, and a gate electrode of the read transistor RT may be connected to a word line WL. The read transistor RT may control the electrical connection between the MTJ and the read bit line RBL.

The write transistor WT may be connected between the first end portion of the heavy metal HM and the write bit line WBL, and a gate electrode of the write transistor WT may be connected to the word line WL. The write transistor WT may control the electrical connection between the heavy metal HM and the write bit line WBL.

In the write operation, the write transistor WT may be turned on through the word line WL. In this case, a write current $I_W$ may flow through the heavy metal HM. A direction of the write current $I_W$ may be set to a second direction or a fourth direction depending on a voltage condition of the write bit line WBL and the source line SL.

The write current $I_W$ may act as the in-plane current that applies the spin orbit torque SOT to the free magnetic pattern FL. The write current $I_W$ may flow in parallel with the interface of the heavy metal HM and the free magnetic pattern FL and may flow to be adjacent to the interface. While the write current $I_W$ flows, a spin current induced by the spin hall effect and/or Rashba effect may flow in a direction perpendicular to the interface between the heavy metal HM and the free magnetic pattern FL, and thus, the spin orbit torque SOT may be applied to the MTJ. In this case, the magnetization direction of the free magnetic pattern FL may be switched to be anti-parallel or parallel to the magnetization direction of the reference magnetic pattern PL. After the magnetization direction of the free magnetic pattern FL is set, the write transistor WT may be turned off. The direction (e.g., anti-parallel or parallel) of the magnetization direction may represent a stored bit (e.g., 1 or 0).

In the read operation, the read transistor RT may be turned on through the word line WL. In this case, a read current $I_R$ may flow from the read bit line RBL to the source line SL. The read current $I_R$ may flow through the MTJ and the heavy metal HM. When the MTJ is set, e.g., to the "1", the read current $I_R$ may flow through the MTJ in a direction (e.g., a third direction) perpendicular to the interface between the heavy metal HM and the MTJ.

Figure 3A:
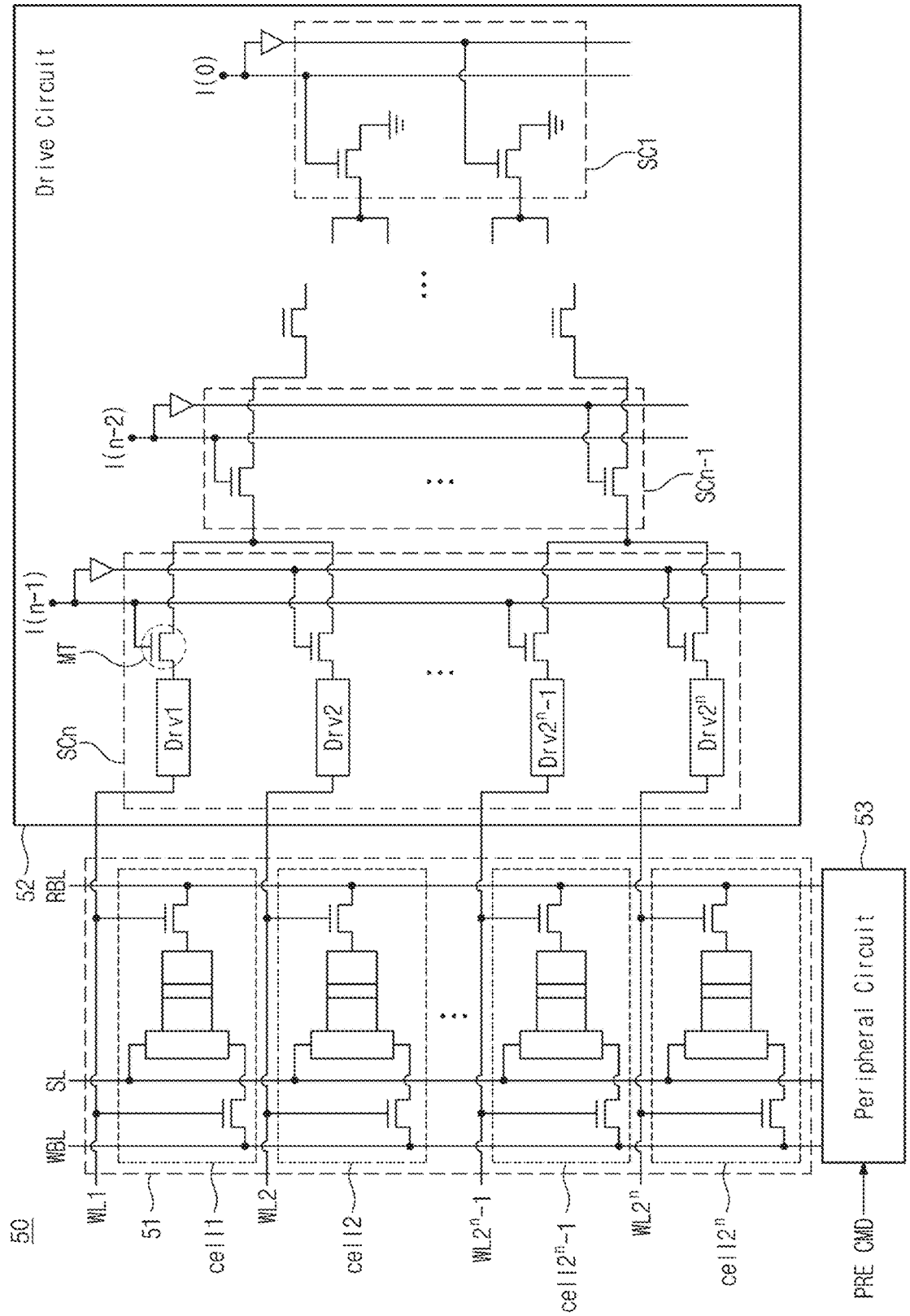
FIGS. 3A and 3B are diagrams illustrating a lookup table LUT included in an FPGA device in detail.
Figure 3B:
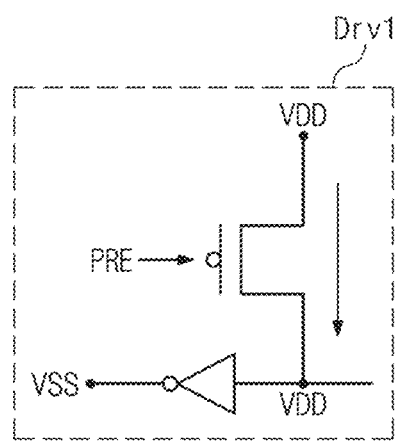

FIGS. 3A and 3B are diagrams illustrating a lookup table LUT included in an FPGA device in detail. The FPGA device 10 of FIG. 1 may include a plurality of lookup tables LUT. In at least one embodiment, in FIGS. 3A and 3B, the description will be described with reference to one lookup table 50. Functions and operations of the remaining lookup tables LUT may be similar to those of the lookup table 50.

Referring to FIGS. 2, 3A, and 3B, the lookup table 50 may include a cell array 51, a drive circuit 52, and a peripheral circuit 53.

The cell array 51 may include a plurality of cells (e.g., cell1 to cell$2^n$). The plurality of cells cell1 to cell$2^n$ may be arranged in the fourth direction and may be respectively connected to a plurality of word lines WL1 to WL$2^n$ (e.g., n being a positive integer of 1 or more).

For example, the gate electrodes of the write transistor WT and the read transistor RT included in the first cell cell1 may be connected to the first word line WL1. The gate electrodes of the write transistor WT and the read transistor RT included in the second cell cell2 may be connected to the second word line WL2.

As in the above description, the gate electrodes of the write transistor WT and the read transistor RT included in the $2^{n-1}$-th cell$2^{n-1}$ may be connected to the $2^{n-1}$-th word line WL$2^{n-1}$. The gate electrodes of the write transistor WT and the read transistor RT included in the $2^n$-th cell cell$2^n$ may be connected to the n-th word line WL$2^n$.

A configuration and an operation of each of the plurality of cells cell1 to cell$2n$ of FIG. 3A are the same (or substantially similar) as those of the cell described with reference to FIG. 2. Thus, additional description will be omitted to avoid redundancy.

The drive circuit 52 may be connected to the cell array 51 through the plurality of word lines WL1 to WL$2^n$. The drive circuit 52 may include first to n-th select circuits SC1 to SCn. Each of the first to n-th select circuits SC1 to SCn may include a plurality of transistors MT. The numbers of transistors MT of the first to n-th select circuits SC1 to SCn may be different.

The plurality of transistors MT may be implemented with, e.g., at least one of an n-type metal-oxide-semiconductor (NMOS) transistor, a p-type metal-oxide-semiconductor PMOS transistor, a high-electron mobility transistor (HEMT), and/or the like. Below, the description will be given under the assumption that each of the plurality of transistors MT is implemented with an NMOS transistor.

For example, the n-th select circuit SCn may include $2^n$ NMOS transistors MT. The (n−1)-th select circuit SCn-1 may include $2^{n-1}$ NMOS transistors MT. As in the above description, the first select circuit SC1 may include two NMOS transistors MT.

The n-th select circuit SCn may further include $2^n$ word line drivers Drv1 to Drv$2^n$ in addition to the $2^n$ NMOS transistors MT. The $2^n$ word line drivers Drv1 to Drv$2^n$ may be respectively connected to the plurality of word lines WL1 to WL$2^n$. The first ends of the $2^n$ word line drivers Drv1 to Drv$2^n$ may be respectively connected to first source/drain terminals of the $2^n$ NMOS transistors MT.

The drive circuit 52 is configured to receive input signals I(0) to I(n−1) from the outside (e.g., from the FPGA controller (not illustrated) described with reference to FIG. 1). The input signals I(0) to I(n−1) may constitute n-bit data. The n data bits may be respectively applied to the first to n-th select circuits SC1 to SCn.

Each of the gate electrodes of the $2^n$ NMOS transistors MT included in the n-th select circuit SCn may be a line to which the input signal I(n−1) is applied. For example, half the gate electrodes of the $2^n$ NMOS transistors MT may be connected to a line to which the input signal I(n−1) having a non-inverted logical value (e.g., "0" or "1") is applied. The other half of the gate electrodes of the $2^n$ NMOS transistors MT may be connected to a line to which the input signal I(n−1) having an inverted logical value (e.g., "1" or "0") is applied.

Second source/drain terminals of the $2^n$ NMOS transistors MT may be connected to first source/drain terminals of the $2^{n-1}$ NMOS transistors MT included in the (n−1)-th select circuit SCn-1.

Each of the gate electrodes of the $2^{n-1}$ NMOS transistors MT included in the (n−1)-th select circuit SCn-1 may be connected to a line to which the input signal I(n−2) is applied. For example, half of the gate electrodes of the $2^{n-1}$ NMOS transistors MT may be connected to a line to which the input signal I(n−2) having a non-inverted logical value (e.g., "0" or "1") is applied. The other half of the gate electrodes of the $2^n$ NMOS transistors MT may be connected to a line to which the input signal I(n−2) having an inverted logical value (e.g., "1" or "0") is applied.

Second source/drain terminals of the $2^{n-1}$ NMOS transistors MT may be connected to first source/drain terminals of the $2^{n-2}$ NMOS transistors MT included in the (n−2)-th select circuit SCn-2.

As in the above description, each of the gate electrodes of the two NMOS transistors MT included in the first select circuit SC1 may be connected to a line to which the input signal I(0) is applied. For example, one of the gate electrodes of the two NMOS transistors MT may be connected to a line to which the input signal I(0) having a non-inverted logical value (e.g., "0" or "1") is applied. The other of the gate electrodes of the two NMOS transistors MT may be connected to a line to which the input signal I(0) having an inverted logical value (e.g., "1" or "0") is applied.

Second source/drain terminals of the two NMOS transistors MT may be connected to a ground terminal.

In this case, only a word line driver connected to one of the word lines WL1 to WL$2^n$ may be driven depending on the logical values of the input signals I(0) to I(n−1). This will be described in detail with reference to FIG. 4A.

In FIG. 3B, the first word line driver Drv1 among the $2^n$ word line drivers Drv1 to Drv$2^n$ may include a PMOS transistor and an inverter. A first source/drain terminal of the PMOS transistor may be connected to a first end of the inverter. A power supply voltage VDD may be applied to a second source/drain terminal of the PMOS transistor. A second end of the inverter may be connected to the first word line WL1.

Configurations and operations of the remaining word line drivers Drv2 to Drv$2^n$ are the same (or substantially similar) as those of the first word line driver Drv1, and thus, additional description will be omitted to avoid redundancy.

The peripheral circuit 53 may be connected to the cell array 51 through the plurality of bit lines WBL and RBL and the source line SL. The peripheral circuit 53 is configured to output control the cell array 51 and the drive circuit 52. An operation of the peripheral circuit 53 will be described For example with reference to FIG. 4.

Although not illustrated, the peripheral circuit 53 may include a sense amplifier, a write driver, a source line driver, an input/output circuit, a control logic circuit, and/or the like. However, components of the peripheral circuit 53 are not limited thereto.

In FIGS. 3A and 3B, the peripheral circuit 53 is configured to receive a precharge command PRE CMD before receiving the input signals I(0) to I(n−1) from the outside (e.g., from the FPGA controller (not illustrated) described with reference to FIG. 1). The peripheral circuit 53 may apply a precharge signal PRE to the $2^n$ word line drivers Drv1 to Drv$2^n$ in response to receiving the precharge command PRE CMD.

In this case, the first end of the inverter included in each of the $2^n$ word line drivers Drv1 to Drv$2^n$ may be charged with the power supply voltage VDD. The second end of the inverter connected to each of the word lines WL1 to WL$2^n$ may be discharged to a ground voltage VSS. Accordingly, all the word lines WL1 to WL$2^n$ may maintain an inactive state.

Figure 4A:
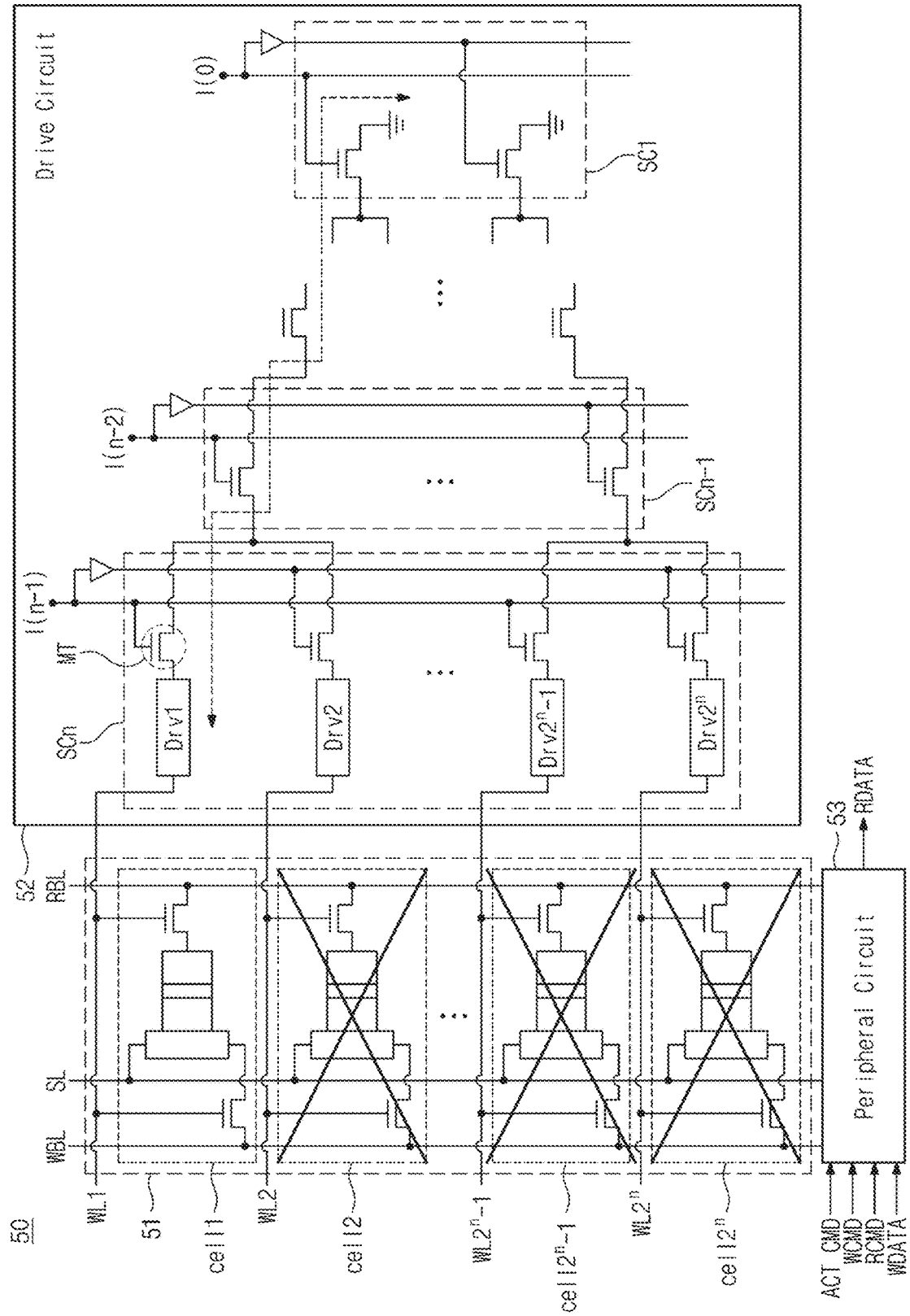
FIGS. 4A to 4C illustrate an example in which a data write operation and a data read operation are performed with respect to one cell included in the lookup table LUT.
Figure 4B:
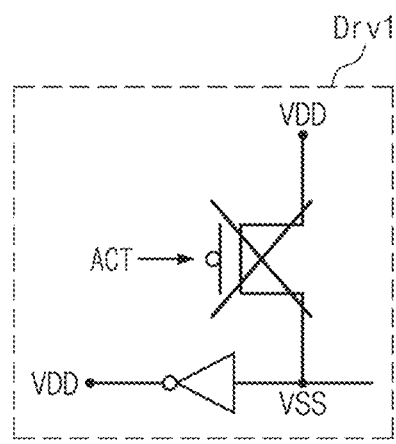
Figure 4C:
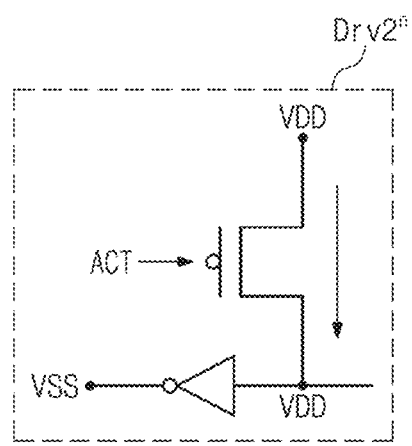

FIGS. 4A to 4C illustrate an example in which a data write operation and a data read operation are performed with respect to one cell included in the lookup table LUT. In at least one embodiment, the data write operation and the data read operation of the first cell cell1 will be described with reference to FIGS. 4A to 4C. The description that is the same (or substantially similar) as the description given with reference to FIGS. 3A and 3B is omitted.

Referring to FIGS. 4A to 4C, the peripheral circuit 53 is configured to receive an activation command ACT CMD from the outside (e.g., from the FPGA controller (not illustrated) described with reference to FIG. 1). The peripheral circuit 53 may apply an activation signal ACT to the $2^n$ word line drivers Drv1 to Drv$2^n$ in response to the activation command ACT CMD. In this case, the first end of the inverter included in each of the $2^n$ word line drivers Drv1 to Drv$2^n$ may be in a state of being charged with the power supply voltage VDD.

The drive circuit 52 is configured to receive the input signals I(0) to I(n−1) under control of the peripheral circuit 53. Each of the input signals I(0) to I(n−1) may have a specific logical value; in this case, at least some of a plurality of transistors included in each of the first to n-th select circuits SC1 to SCn may be turned on.

For example, when the input signal I(n−1) is applied to the n-th select circuit SCn, half of the $2^n$ NMOS transistors MT may be turned on. When the input signal I(n−2) is applied to the (n−1)-th select circuit SCn-1, half of the 2-1 NMOS transistors MT may be turned on. When the input signal I(0) is applied to the first select circuit SC1, one of the two NMOS transistors MT may be turned on.

For example, when each of the input signals I(0) to I(n−1) has a specific logical value, a current path may be formed between the ground terminal and the first end of the first word line driver Drv1 connected to the first source/drain terminal of the NMOS transistor MT.

In this case, a current may flow from the first end of the first word line driver Drv1 to the ground terminal due to a voltage difference, and thus, the first end of the inverter included in the first word line driver Drv1 may be discharged to the ground voltage VSS.

As such, the second end of the inverter included in the first word line driver Drv1 may be charged with the power supply voltage VDD. Accordingly, the first word line WL1 among the plurality of word lines WL1 to WL$2^n$ may be activated.

For example, when each of the input signals I(0) to I(n−1) has a specific logical value, a current path may not be formed between the ground terminal and the first end of the $2^n$ word line driver Drv$2^n$ connected to the first source/drain terminal of the NMOS transistor MT.

In this case, the voltage level of the first end of the inverter included in the $2^n$ word line driver Drv$2^n$ may be maintained at the level of the power supply voltage VDD.

As such, the voltage level of the second end of the inverter included in the $2^n$ word line driver Drv$2^n$ may be maintained at the level of the ground voltage VSS. Accordingly, the $2^n$ word line WL$2^n$ among the plurality of word lines WL1 to WL$2^n$ may not be activated.

After the first word line WL1 is activated, the peripheral circuit 53 is configured to receive the write command WCMD and the write data WDATA from the outside. The peripheral circuit 53 may further include a table (not illustrated) configured to store an operation result of input signals. The operation may be at least one of an addition operation and a multiplication operation.

The peripheral circuit 53 may refer to an operation result according to specific logical values of the input signals from the table (not illustrated) and may determine voltage levels of the write bit line WBL and the source line SL based on the write data WDATA.

The peripheral circuit 53 may generate the write current $I_W$ in the second direction (refer to FIG. 2) or the fourth direction (refer to FIG. 2), based on the voltage levels of the write bit line WBL and the source line SL. The peripheral circuit 53 may perform the data write operation based on the write current $I_W$.

The peripheral circuit 53 may write the write data WDATA (e.g., "0" or "1") to the SOT-MRAM included in the first cell cell1 in a state where the write transistor WT included in the first cell cell1 is turned on by the first word line WL1 thus activated.

After the data write operation, the peripheral circuit 53 is configured to receive the read command RCMD from the outside. The peripheral circuit 53 may sense a voltage change of the read bit line RBL to generate the read current $I_R$ in the third direction (refer to FIG. 2).

The peripheral circuit 53 may perform the data read operation based on the read current $I_R$. The peripheral circuit 53 may read the data RDATA (e.g., "0" or "1") stored in the SOT-MRAM included in the first cell cell1 in a state where the read transistor RT included in the first cell cell1 is turned on by the first word line WL1 thus activated.

As described above, in FIGS. 3A and 4A, the drive circuit 52 may include the first to n-th select circuits SC1 to SCn. Accordingly, the drive circuit 52 may include $(2^{n+1}-2)$ NMOS transistors MT. In this case, the drive circuit 52 may occupy a significant portion of the area of the lookup table 50. Accordingly, there may be required a way to design the lookup table LUT capable of implementing the FPGA device 10 with the small area.

Also, the read transistor RT included in each of the cells described with reference to FIGS. 3A and 4A may be connected to one read bit line RBL. In this case, parasitic capacitances (not illustrated) of the $2^n$ read transistors RT may be accumulated. For example, the read bit line RBL may have a great capacitance value, thereby causing an increase in power consumption in the data read operation and an increase in a time taken to perform the data read operation. Accordingly, there may be required a way to design the lookup table LUT capable of implementing the FPGA device 10 providing improved energy efficiency.

Figure 5:
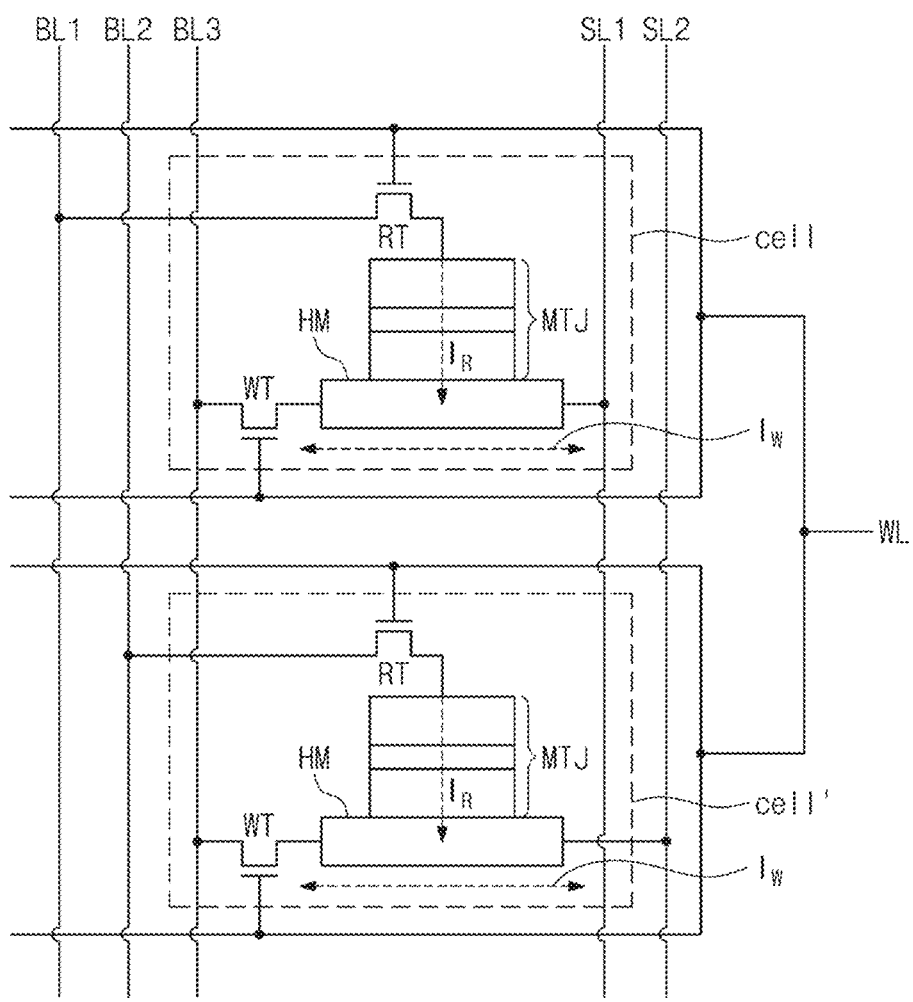
FIG. 5 is a diagram illustrating two cells included in an FPGA device in detail, according to at least one embodiment of the present disclosure.

FIG. 5 is a diagram illustrating two cells included in an FPGA device in detail, according to at least one embodiment of the present disclosure. Each of the plurality of lookup tables LUT included in the FPGA device 10 of FIG. 1A may include a plurality of cells. In at least one embodiment, in FIG. 5, the description will be given with reference to two cells, and functions and operations of the remaining cells may be similar to a function and an operation of the two cells. The description that is the same (or substantially similar) as the description given with reference to FIG. 2 is omitted.

Referring to FIG. 5, two cells (hereinafter referred to as "first and second cells" cell and cell' may be connected to one word line WL.

A first end portion of the heavy metal HM included in the first cell "cell" may be connected to the first source/drain terminal of the write transistor WT, and the second end portion of the heavy metal HM may be connected to a first source line SL1.

The MTJ included in the first cell "cell" may be interposed between the first source/drain terminal of the read transistor RT and the heavy metal HM and may be connected to the first source/drain terminal of the read transistor RT.

The second source/drain terminal of the write transistor WT included in the first cell "cell" may be connected to a third bit line BL3. The second source/drain terminal of the read transistor RT included in the first cell "cell" may be connected to a first bit line BL1.

The read transistor RT included in the first cell "cell" may be connected between the MTJ and the first bit line BL1, and the gate electrode of the read transistor RT may be connected to the word line WL. The read transistor RT may control the electrical connection between the MTJ and the first bit line BL1.

The write transistor WT may be connected between the first end portion of the heavy metal HM and the third bit line BL3, and the gate electrode of the write transistor WT may be connected to the word line WL. Thus, the write transistor WT may control the electrical connection between the heavy metal HM and the third bit line BL3.

In the write operation, the write transistor WT included in the first cell "cell" may be turned on through the word line WL. In this case, a direction of the write current $I_W$ flowing through the heavy metal HM may be set (or changed) to the first direction (refer to FIG. 2) or the third direction (refer to FIG. 2) depending on a voltage condition of the third bit line BL3 and the first source line SL1.

In the read operation, the read transistor RT may be turned on through the word line WL. As such, the read current $I_R$ may flow through the MTJ and the heavy metal HM from the first bit line BL1. The read current $I_R$ may flow through the MTJ in a direction (i.e., the fourth direction (refer to FIG. 2) perpendicular to the interface between the heavy metal HM and the MTJ.

The first end portion of the heavy metal HM included in the second cell cell' may be connected to the first source/drain terminal of the write transistor WT, and the second end portion of the heavy metal HM may be connected to a second source line SL2.

The second source/drain terminal of the write transistor WT included in the second cell cell' may be connected to the third bit line BL3. The second source/drain terminal of the read transistor RT included in the second cell cell' may be connected to the second bit line BL2.

The read transistor RT included in the second cell cell' may be connected between the MTJ and the second bit line BL2, and the gate electrode of the read transistor RT may be connected to the word line WL. The read transistor RT may control the electrical connection between the MTJ and the second bit line BL2.

In the write operation, the write transistor WT included in the second cell cell' may be turned on through the word line WL. In this case, a direction of the write current $I_W$ flowing through the heavy metal HM may be set (or changed) to the first direction (refer to FIG. 2) or the third direction (refer to FIG. 2) depending on a voltage condition of the second bit line BL3 and the second source line SL2.

In the read operation, the read transistor RT may be turned on through the word line WL. As such, the read current $I_R$ may flow through the MTJ and the heavy metal HM from the second bit line BL2. The read current $I_R$ may flow through the MTJ in a direction (i.e., the fourth direction (refer to FIG. 2) perpendicular to the interface between the heavy metal HM and the MTJ.

Figure 6:
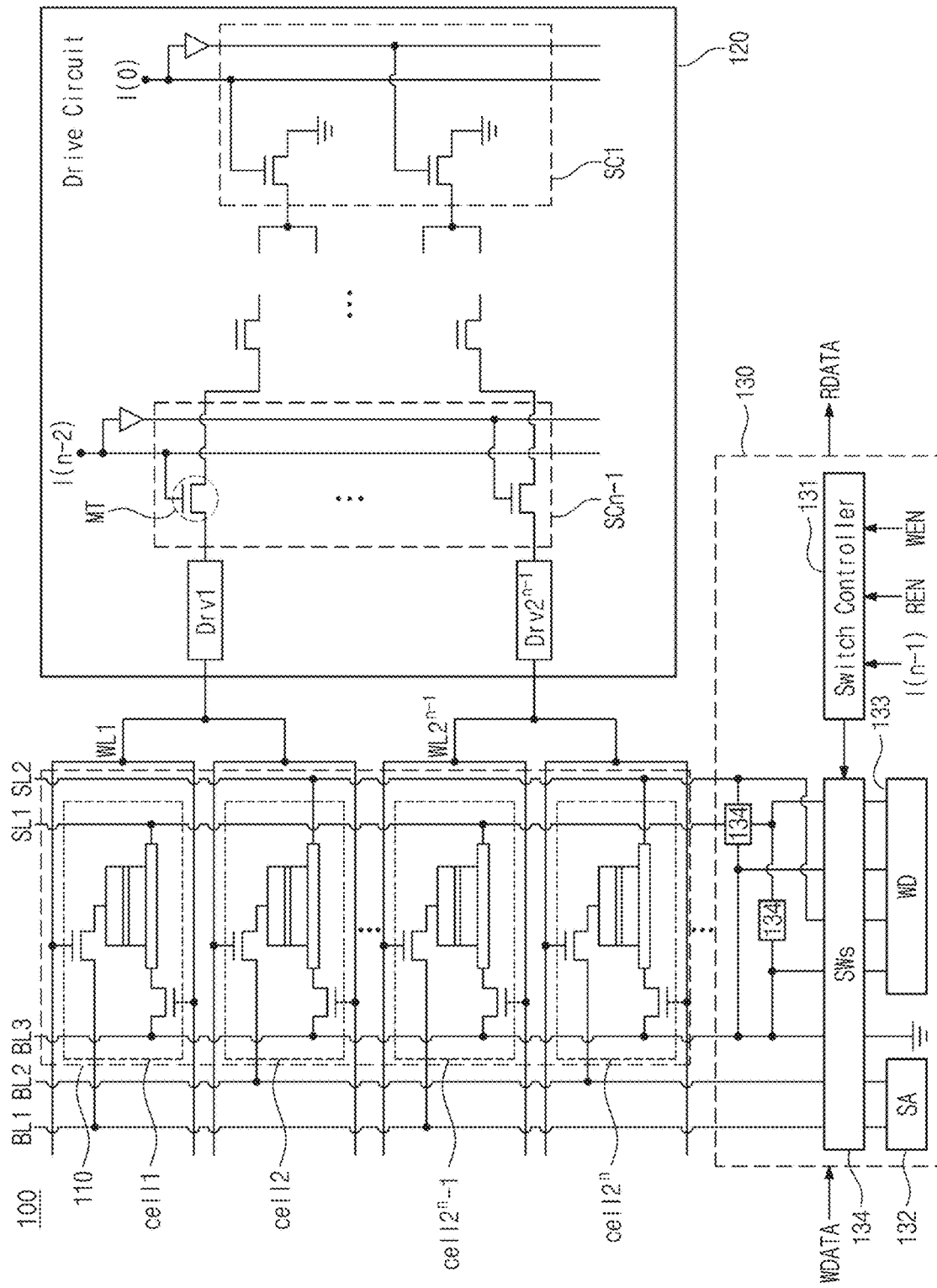
FIG. 6 is a diagram illustrating the lookup table LUT included in an FPGA device in detail, according to at least one embodiment of the present disclosure.

FIG. 6 is a diagram illustrating the lookup table LUT included in an FPGA device in detail, according to at least one embodiment of the present disclosure. The FPGA device 10 of FIG. 1 may include the plurality of lookup tables LUT. In at least one embodiment, in FIGS. 6, the description will be described with reference to one lookup table 100. Functions and operations of the remaining lookup tables LUT may be similar to those of the lookup table 100.

With respect to a cell array 110, a drive circuit 120, and a peripheral circuit 130 included in the lookup table LUT of FIG. 6, the description that is the same (or substantially similar) as that described with reference to FIGS. 3A and 3B is omitted.

Referring to FIGS. 5 and 6, a first cell cell1 and a second cell cell2 included in the cell array 110 may be connected to the first word line WL1, and a $(2^n-1)$-th cell cell(2'-1) and a $2^n$-th cell cell$2^n$ included in the cell array 110 may be connected to the $2^{n-1}$-th word line WL$2^{n-1}$.

For example, the gate electrodes of the write transistor WT and the read transistor RT included in the first cell cell1 and the gate electrodes of the write transistor WT and the read transistor RT included in the second cell cell2 may be connected to the first word line WL1.

For example, the gate electrodes of the write transistor WT and the read transistor RT included in the $(2^{n-1})$-th cell cell($2^n$-1) and the gate electrodes of the write transistor WT and the read transistor RT included in the $2^n$-th cell cell$2^1$ may be connected to the $2^{n-1}$-th word line WL$2^{n-1}$.

Configurations and operations of the first cell cell1, the second cell cell2, the $(2^1-1)$-th cell cell($2^n$-1), and the $2^1$-th cell cell$2^n$ are the same (or substantially similar) as those of the two cells cell and cell' described with reference to FIG. 5. Thus, additional description will be omitted to avoid redundancy.

The drive circuit 120 may be connected to the cell array 110 through the plurality of word lines WL1 to WL$2^{n-1}$. The drive circuit 120 may include first to (n−1)-th select circuits SC1 to SCn-1.

Unlike the drive circuit 52 of FIGS. 3A and 4A, the drive circuit 120 of FIG. 6 may not include the n-th select circuit SCn. Accordingly, the number of NMOS transistors MT included in the drive circuit 120 may be ($2^n$-2).

Accordingly, the area of the drive circuit 120 of FIG. 6 may be smaller than the area of the drive circuit 52 of FIGS. 3A and 4A. This may mean that it is possible to design the lookup table 100 with a smaller area.

The (n−1)-th select circuit SCn-1 may further include $2^{n-1}$ word line drivers Drv1 to Drv$2^{n-1}$ in addition to the $2^{n-1}$ NMOS transistors MT. The $2^{n-1}$ word line drivers Drv1 to Drv$2^{n-1}$ may be respectively connected to the plurality of word lines WL1 to WL$2^{n-1}$. The first ends of the $2^{n-1}$ word line drivers Drv1 to Drv$2^{n-1}$ may be respectively connected to the first source/drain terminals of the $2^{n-1}$ NMOS transistors MT.

That is, in FIGS. 3A and 4A, the n-th select circuit SCn may include the $2^n$ word line drivers Drv1 to Drv$2^n$; however, in FIG. 6, the (n−1)-th select circuit SCn-1 may include half the word line drivers of the n-th select circuit SCn.

The drive circuit 120 is configured to receive first input signals I(0) to I(n−2) from the outside. Unlike the drive circuit 52 of FIG. 3A, because the drive circuit 120 of FIG. 6 includes the first to (n−1)-th select circuits SC1 to SCn-1, (n−1) data bits may be respectively applied to the first to (n−1)-th select circuits SC1 to SCn-1. A second input signal I(n−1) different from the first input signals I(0) to I(n−2) may be received from the peripheral circuit 130.

In these cases, only a word line driver connected to one of the word lines WL1 to WL$2^{n-1}$ may be driven depending on the logical values of the first input signals I(0) to I(n−2). This will be described in detail with reference to FIGS. 9A to 11C.

The peripheral circuit 130 may be connected to the cell array 110 through the plurality of bit lines BL1, BL2 and BL3 and the plurality of source lines SL1 and SL2.

For example, the peripheral circuit 53 of FIGS. 3A and 4A may be connected to the cell array 51 through two bit lines RBL and WBL and one source line SL, while the peripheral circuit 130 of FIG. 6 may be connected to the cell array 110 through three bit lines BL1, BL2, and BL3 and two source lines SL1 and SL2.

The peripheral circuit 130 may generate a write enable signal WEN in response to the write command WCMD (refer to FIG. 3) received from the outside. The peripheral circuit 130 may generate a read enable signal REN in response to the read command RCMD (refer to FIG. 3) received from the outside.

In FIG. 6, the peripheral circuit 130 may include a switch controller 131, a sense amplifier (SA) 132, a write driver (WD) 133, and a plurality of switches 134.

The switch controller 131 is configured to output control signals to the plurality of switches 134. The plurality of bit lines BL1, BL2, and BL3, the plurality of source lines SL1 and SL2, the sense amplifier 132, the write driver 133, and the ground terminal may be electrically connected based on the control signals. The switch controller 131 may control the plurality of switches 134.

The switch controller 131 is configured to receive the second input signal I(n−1), the write enable signal WEN, and the read enable signal REN. The switch controller 131 may output the control signals for controlling the plurality of switches 134, based on the second input signal I(n−1), the write enable signal WEN, and the read enable signal REN. The switch controller 131 will be described in detail with reference to FIG. 7.

The peripheral circuit 130 may perform the data write operation based on the write enable signal WEN. The peripheral circuit 130 may perform the data read operation based on the read enable signal REN.

In FIG. 6, $2^{n-1}$ cells may be connected to the first bit line BL1. Likewise, $2^{n-1}$ cells may be connected to the second bit line BL2. That is, in FIGS. 3A and 4A, the $2^n$ cells may be connected to one read bit line RBL; however, in FIG. 6, only $2^{n-1}$ cells may be connected to one bit line BL1 or BL2 and only $2^{n-1}$ cells may be connected to the other bit line BL1 or BL2.

A capacitance value of one bit line BL1 or BL2 of FIG. 6 may be smaller than a capacitance value of the read bit line RBL of FIGS. 3A and 4A. Accordingly, a speed at which stored charges are discharged in the read operation may be improved, and power consumption in the read operation and a time taken to perform the read operation may decrease.

Also, the energy that is consumed to charge a capacitor of one bit line BL1 or BL2 and to develop a voltage level may decrease. Accordingly, it may be possible to implement the FPGA device 10 capable of improving the energy efficiency in the read operation.

Figure 7:
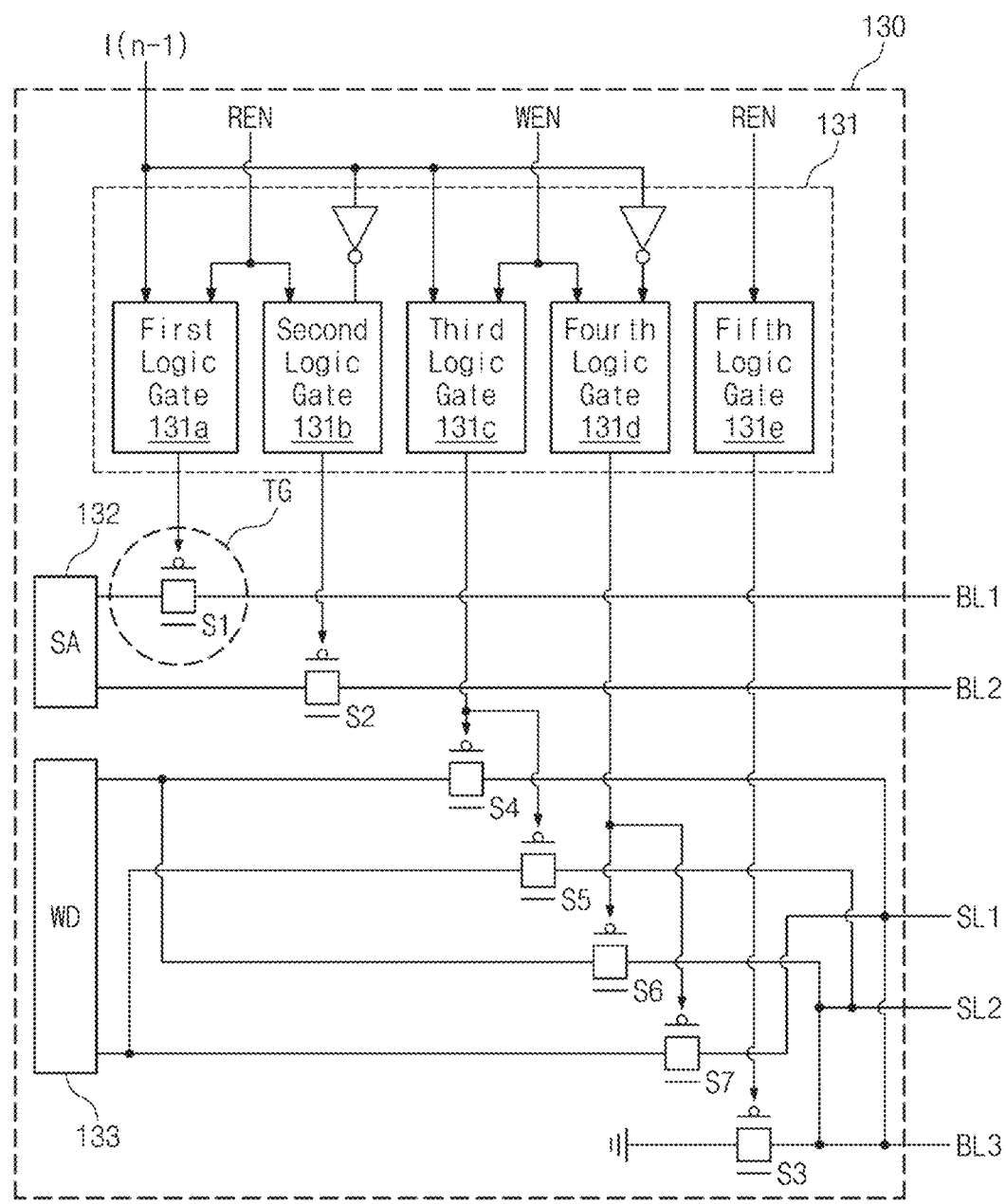
FIG. 7 is a diagram illustrating a switch controller included in the lookup table LUT in detail, according to at least one embodiment of the present disclosure.

FIG. 7 is a diagram illustrating a switch controller included in the lookup table LUT in detail, according to at least one embodiment of the present disclosure.

Referring to FIGS. 6 and 7, the peripheral circuit 130 may include the switch controller 131, the sense amplifier 132, and the write driver 133. The switch controller 131 may include first to fifth logic gates 131a to 131e.

The first to fifth logic gates 131a to 131e are configured to output control signals for controlling first to seventh switches S1 to S7.

In at least one embodiment, each of the first to seventh switches S1 to S7 may be implemented with a transmission gate TG. The transmission gate TG may be composed of a p-type metal-oxide semiconductor (PMOS) transistor and an n-type MOS (NMOS) transistor connected in parallel. In the transmission gate TG, a control signal may be applied to the gate electrode of the PMOS transistor and the gate electrode of the NMOS transistor.

The control signal may include a signal of an inverted logical value applied to the gate electrode of the PMOS transistor and a signal of a non-inverted logical value applied to the gate electrode of the NMOS transistor.

The first and second logic gates 131a and 131b are configured to receive the read enable signal REN.

The first logic gate 131a may receive the second input signal I(n−1) being not inverted. The first logic gate 131a may perform the logical operation based on the second input signal I(n−1) not being inverted and the read enable signal REN and may output the control signal for controlling the first switch S1.

Although not illustrated, in the first switch S1, the gate electrode of the PMOS transistor, and the gate electrode of the NMOS transistor may be connected to the first logic gate 131a. Accordingly, in the first switch S1, the control signal may be applied to the gate electrode of the PMOS transistor and the gate electrode of the NMOS transistor.

The second logic gate 131b may receive an inverted version of the second input signal I(n−1). The second logic gate 131b may perform the logical operation based on the inverted version of the second input signal I(n−1) and the read enable signal REN and may output the control signal for controlling the second switch S2.

Although not illustrated, in the second switch S2, the gate electrode of the PMOS transistor and the gate electrode of the NMOS transistor may be connected to the second logic gate 131b. Accordingly, in the second switch S2, the control signal may be applied to the gate electrode of the PMOS transistor and the gate electrode of the NMOS transistor.

For example, when the second input signal I(n−1) has a first logical value (e.g., "1"), the sense amplifier 132 included in the peripheral circuit 130 may be connected to the first bit line BL1 based on the control signal of the first logic gate 131a. The sense amplifier 132 included in the peripheral circuit 130 may not be connected to the second bit line BL2 based on the control signal of the second logic gate 131b.

For example, when the second input signal I(n−1) has a second logical value (e.g., "0"), the sense amplifier 132 included in the peripheral circuit 130 may not be connected to the first bit line BL1 based on the control signal of the first logic gate 131a. The sense amplifier 132 included in the peripheral circuit 130 may be connected to the second bit line BL2 based on the control signal of the second logic gate 131b.

The third and fourth logic gates 131c and 131d are configured to receive the write enable signal WEN.

The third logic gate 131c may receive the second input signal I(n−1) being not inverted. The third logic gate 131c may perform the logical operation based on the second input signal I(n−1) being not inverted and the write enable signal WEN and may output the control signal for controlling the fourth and fifth switches S4 and S5.

Although not illustrated, in each of the fourth and fifth switches S4 and S5, the gate electrode of the PMOS transistor and the gate electrode of the NMOS transistor may be connected to the third logic gate 131c. Accordingly, in the fourth and fifth switches S4 and S5, the control signal may be applied to the gate electrode of the PMOS transistor and the gate electrode of the NMOS transistor.

The fourth logic gate 131d may receive the inverted version of the second input signal I(n−1). The fourth logic gate 131d may perform the logical operation based on the inverted version of the second input signal I(n−1) and the write enable signal WEN and may output the control signal for controlling the sixth and seventh switches S6 and S7.

Although not illustrated, in each of the sixth and seventh switches S6 and S7, the gate electrode of the PMOS transistor and the gate electrode of the NMOS transistor may be connected to the fourth logic gate 131d. Accordingly, in the sixth and seventh switches S6 and S7, the control signal may be applied to the gate electrode of the PMOS transistor and the gate electrode of the NMOS transistor.

For example, when the second input signal I(n−1) has the first logical value (e.g., "1"), the write driver 133 included in the peripheral circuit 130 may be connected to the third bit line BL3 and the plurality of source lines SL1 and SL2 based on the control signal of the third logic gate 131c.

For example, when the second input signal I(n−1) has the second logical value (e.g., "0"), the write driver 133 included in the peripheral circuit 130 may be connected to the third bit line BL3 and the plurality of source lines SL1 and SL2 based on the control signal of the fourth logic gate 131d.

Each of the first to fourth logic gates 131a to 131d may include an AND gate; in this case, the logical operation may include the AND operation.

The fifth logic gate 131e is configured to receive the read enable signal REN. The fifth logic gate 131e is configured to output the control signal for controlling the third switch S3 based on the read enable signal REN.

Although not illustrated, in the third switch S3, the gate electrode of the PMOS transistor and the gate electrode of the NMOS transistor may be connected to the fifth logic gate 131e. Accordingly, in the third switch S3, the control signal may be applied to the gate electrode of the PMOS transistor and the gate electrode of the NMOS transistor.

For example, when the switch controller 131 receives the read enable signal REN, the third bit line BL3 may be connected to the ground terminal.

Figure 8A:
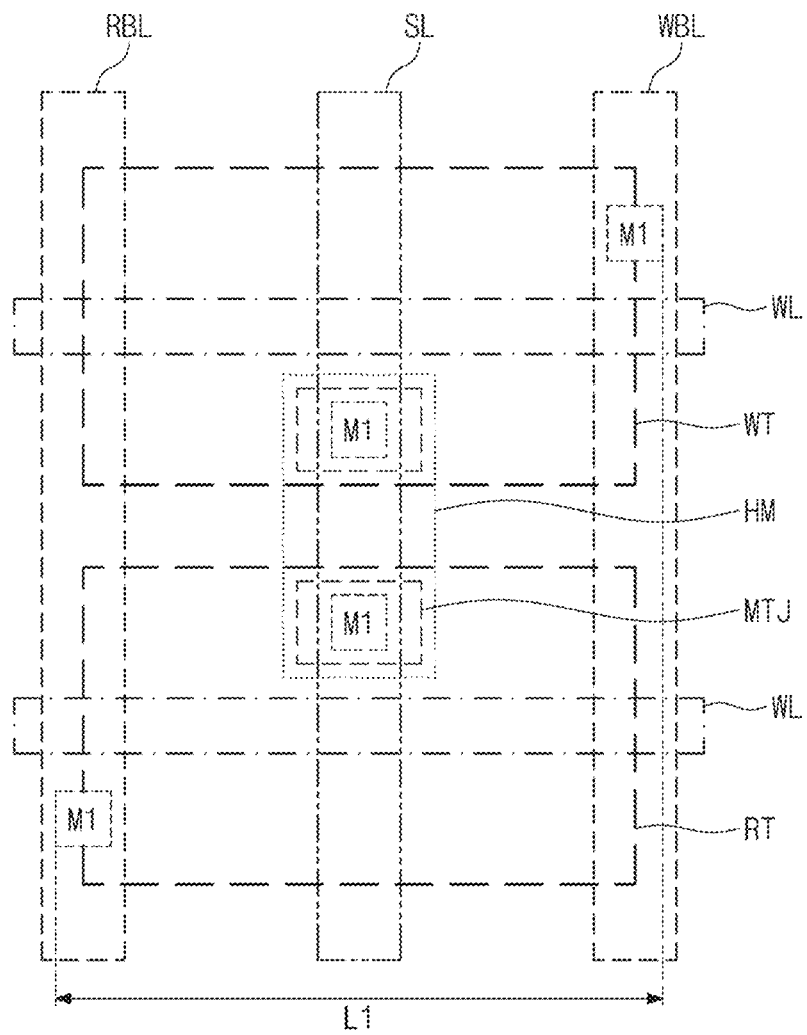
FIG. 8A is a plan view of one cell of FIG. 2.

FIG. 8A is a plan view of one cell of FIG. 2. Referring to FIGS. 2 and 8A, the write transistor WT and the read transistor RT may be formed in a semiconductor substrate (not illustrated). The semiconductor substrate (not illustrated) may be a silicon substrate, a germanium substrate, a silicon-germanium substrate, and/or the like.

The word lines WL and first metals M1 may be disposed on the write transistor WT and the read transistor RT. The first metals M1 may be connected to the write transistor WT and the read transistor RT through metal contacts (not illustrated).

The read bit line RBL and the write bit line WBL may be disposed on the first metals M1. The read bit line RBL and the write bit line WBL may be connected to the first metals M1 through metal contacts (not illustrated). The read bit line RBL and the write bit line WBL may be disposed on the semiconductor substrate (not illustrated) so as to cross the word line WL.

The MTJ may be disposed on the first metal M1 disposed on the read transistor RT. the heavy metal HM may be disposed on the first metal M1 and the MTJ disposed on the write transistor WT. The heavy metal HM may be connected to the first metals M1 disposed on the write transistor WT through a metal contact (not illustrated).

The source line SL may be disposed on the heavy metal HM. The source line SL may be connected to the heavy metal HM through a metal contact (not illustrated). In FIG. 8A, a length of a cell in a horizontal direction may be "L1". The length L1 may be defined as a horizontal distance from one side of the first metal M1 disposed on the read transistor RT to one side of the first metal M1 disposed on the write transistor WT.

Figure 8B:
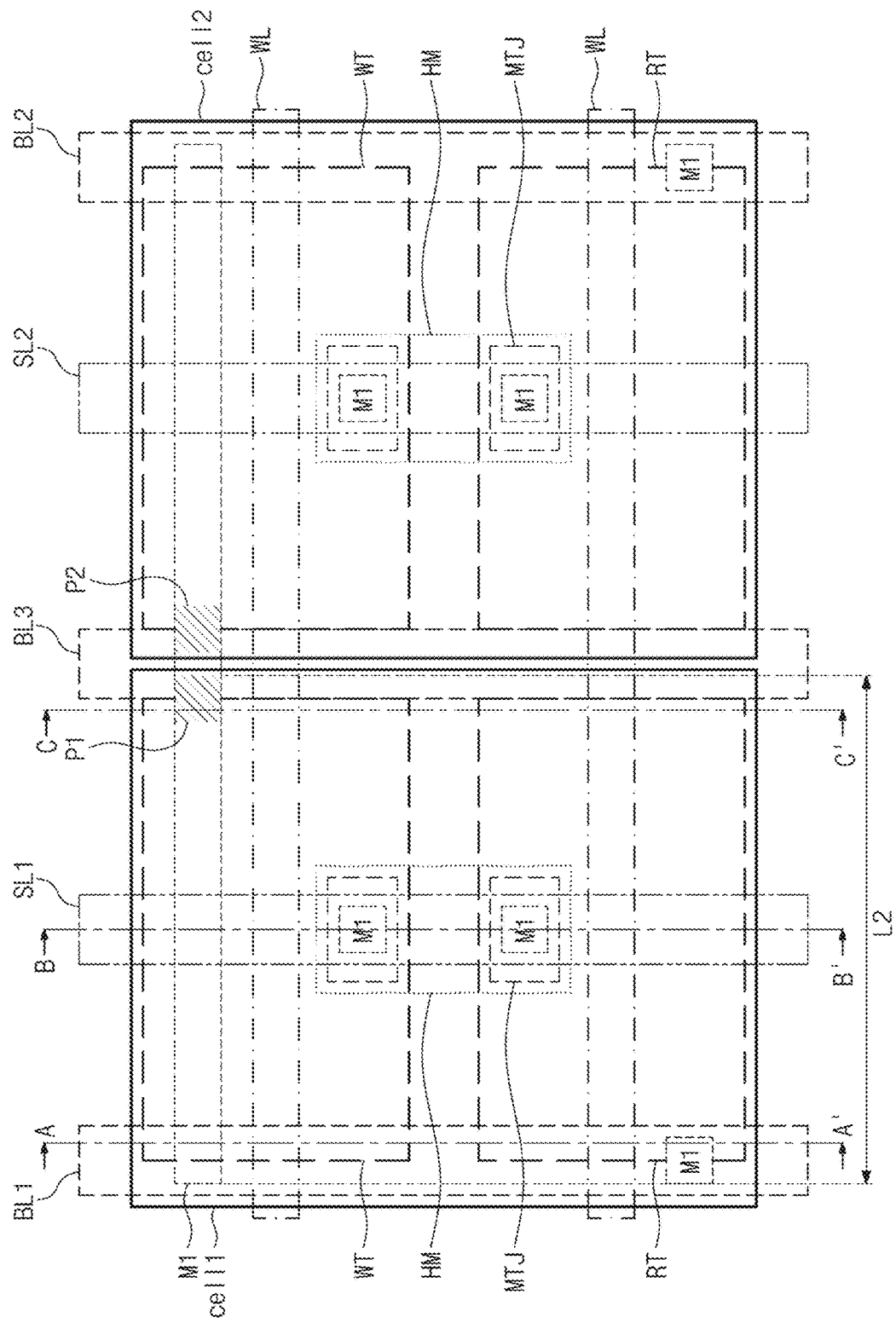
FIG. 8B is a plan view of two cells of FIG. 5, according to at least one embodiment of the present disclosure.
Figure 8C:
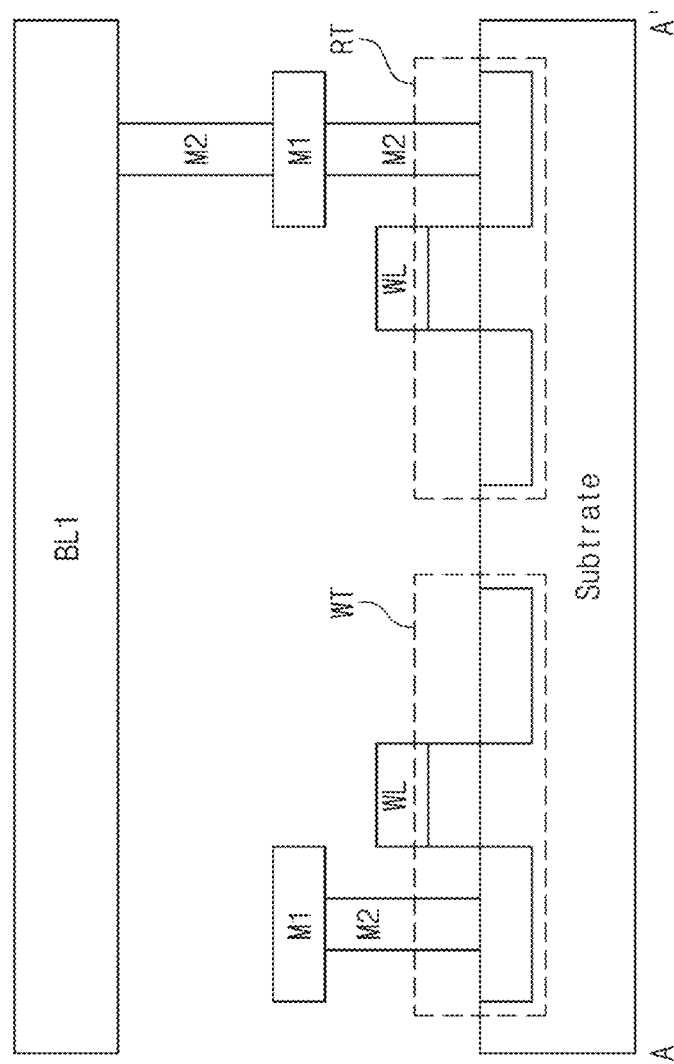
FIGS. 8C to 8E are cross-sectional views taken along line A-A', line B-B', and line C-C' of FIG. 8B.
Figure 8D:
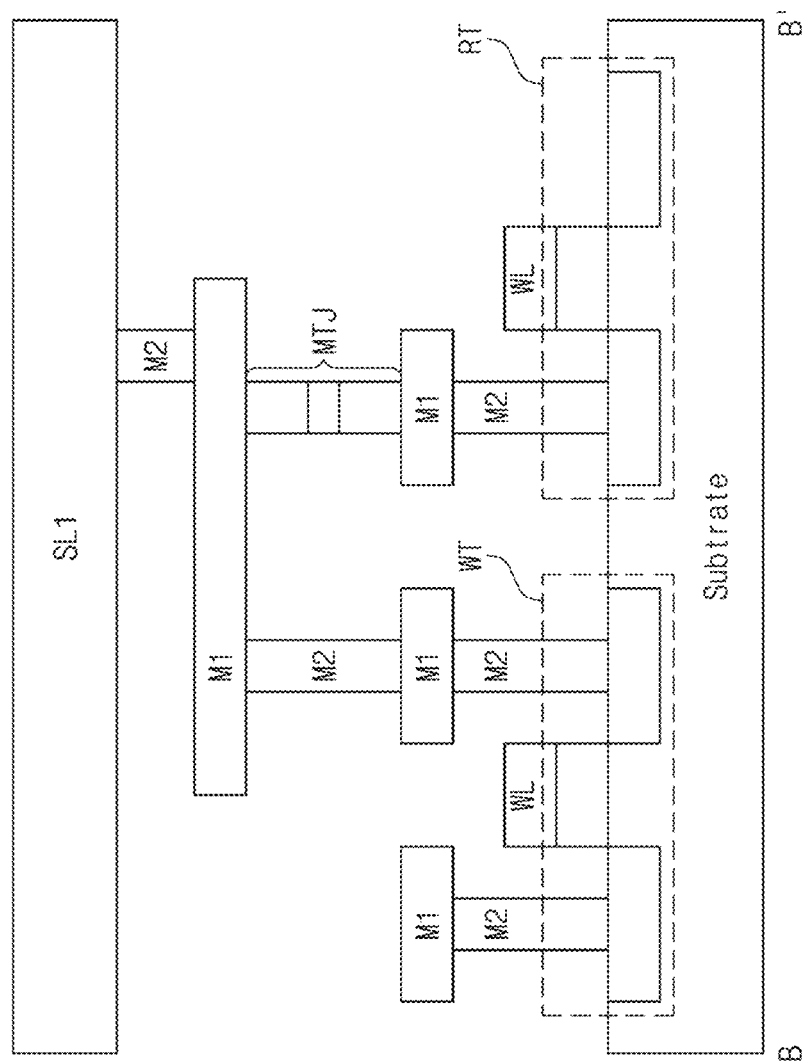
Figure 8E:
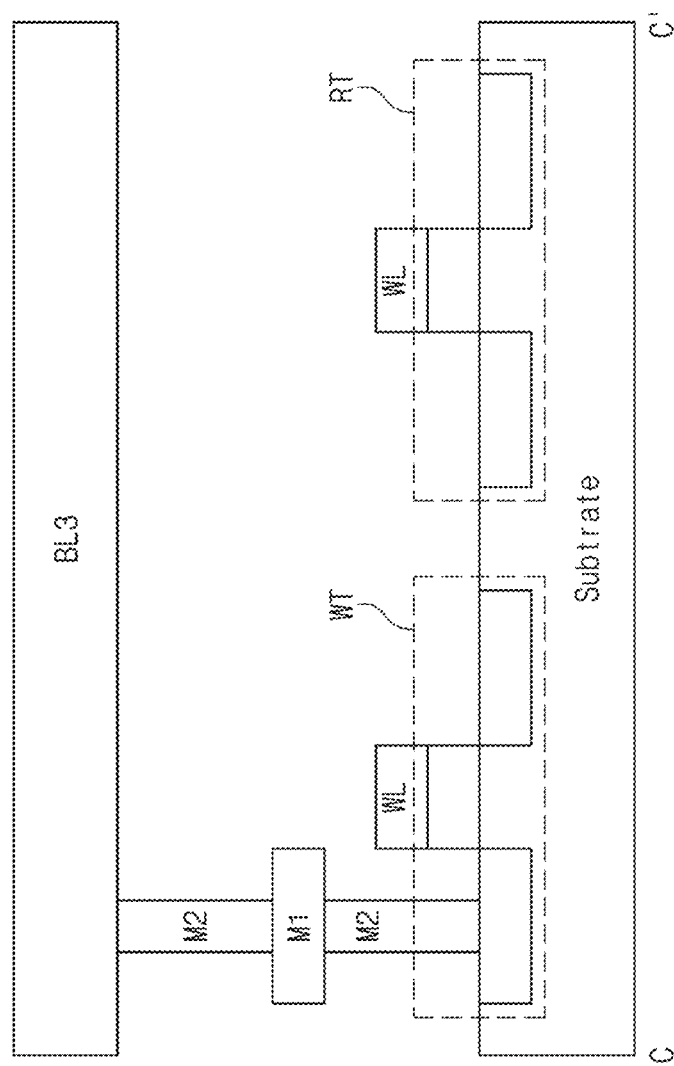

FIG. 8B is a plan view of two cells of FIG. 5, according to at least one embodiment of the present disclosure. FIGS. 8C to 8E are cross-sectional views taken along line A-A', line B-B', and line C-C' of FIG. 8B. The description that is the same (or substantially similar) as the description given with reference to FIG. 8A is omitted.

Referring to FIGS. 8B to 8E, the write transistor WT and the read transistor RT may be formed in a semiconductor substrate.

The word lines WL and the first metals M1 may be disposed on the write transistor WT and the read transistor RT. The first metals M1 may be connected to the write transistor WT and the read transistor RT through metal contacts M2.

The first to third bit lines BL1 to BL3 may be disposed on the first metals M1. The first to third bit lines BL1 to BL3 may be connected to the first metals M1 through the metal contacts M2.

For example, the first and second bit lines BL1 and BL2 may be disposed on the first metals M1 disposed on the read transistors RT. The first and second bit lines BL1 and BL2 may be connected to the first metals M1 disposed on the read transistors RT through the metal contacts M2. The first and second bit lines BL1 and BL2 may not be connected to the first metals M1 disposed on the write transistors WT.

The third bit line BL3 may be disposed on the first metal M1 disposed on the write transistors WT. The third bit line BL3 may be connected to the first metal M1 disposed on the write transistors WT through the metal contact M2.

In FIG. 8B, a first region P1 may indicate a portion where the first metal M1 disposed on the write transistor WT included in the first cell cell1 is connected to the third bit line BL3 through the metal contact M2.

In FIG. 8B, a second region P2 may indicate a portion where the first metal M1 disposed on the write transistor WT included in the second cell cell2 is connected to the third bit line BL3 through the metal contact M2. The third bit line BL3 may not be connected to the first metals M1 disposed on the read transistors RT.

The first to third bit lines BL1 to BL3 may be disposed on the semiconductor substrate so as to cross the word line WL.

The MTJs may be disposed on the first metals M1 that are respectively disposed on the read transistors RT. The heavy metals HM may be disposed on the first metals M1 and the MTJs disposed on the write transistors WT. The heavy metals HM may be connected to the first metals M1 disposed on the write transistors WT through the metal contacts M2.

The plurality of source lines SL1 and SL2 may be disposed on the heavy metals HM. The plurality of source lines SL1 and SL2 may be connected to the heavy metals HM and the metal contacts M2, respectively.

In FIG. 8B, a length of a cell in a horizontal direction may be "L2". The length L2 may be defined as a horizontal distance from one side of the first metal M1 disposed on the read transistor RT included in the first cell cell1 to one side of the first region P1.

In FIG. 8B, two cells cell1 and cell2 disposed in the first direction (refer to FIG. 2) may be connected to the first to third bit lines BL1 to BL3 and may share the third bit line BL3 and the word line WL. In FIG. 8A, one cell may be connected to the read and write bit lines RBL and WBL. Accordingly, the length L2 of FIG. 8B may be smaller than the length L1 of FIG. 8A. This may mean that the implementation of the FPGA device 10 with the small area is possible.

Figure 9A:
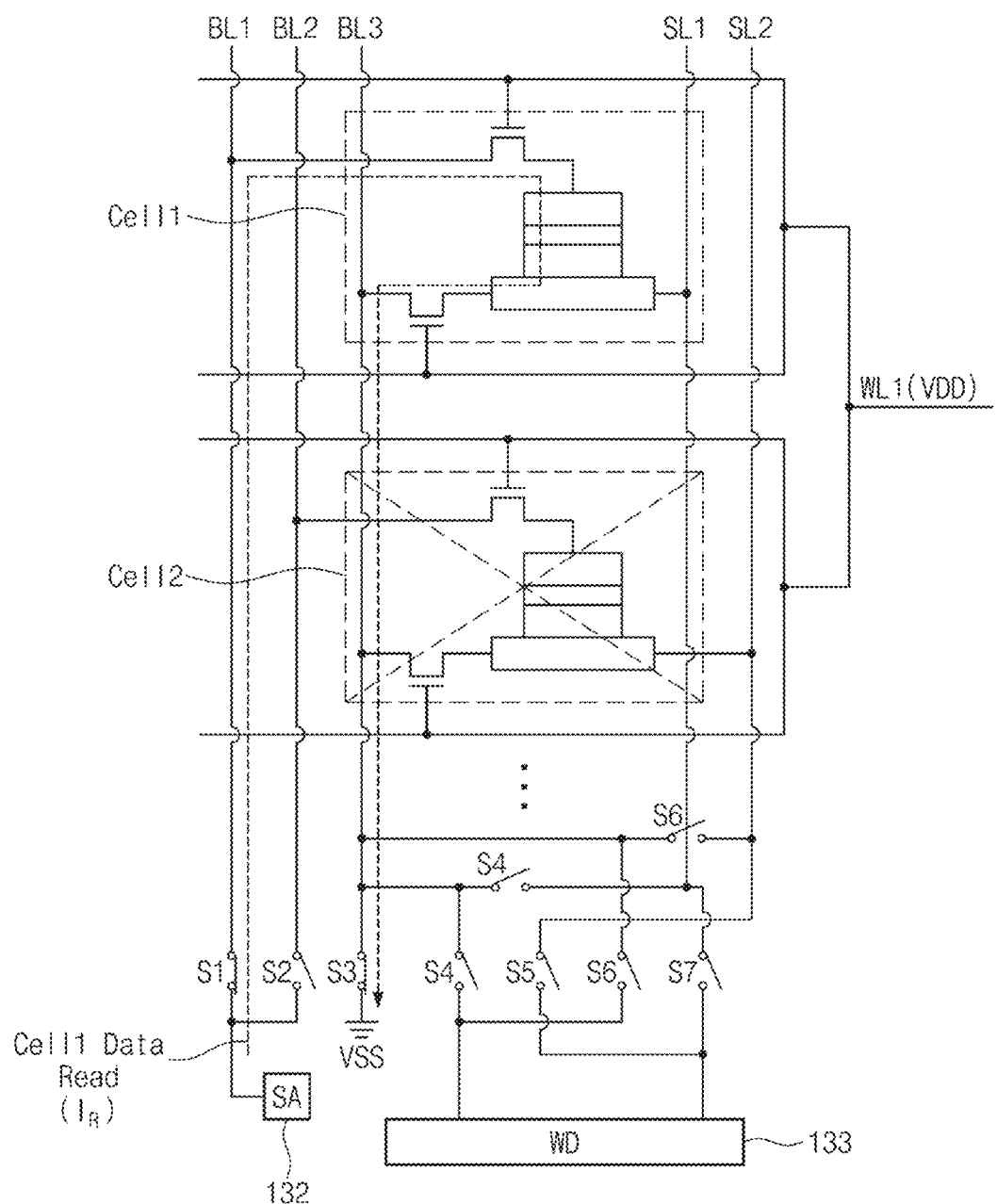
Figure 9B:
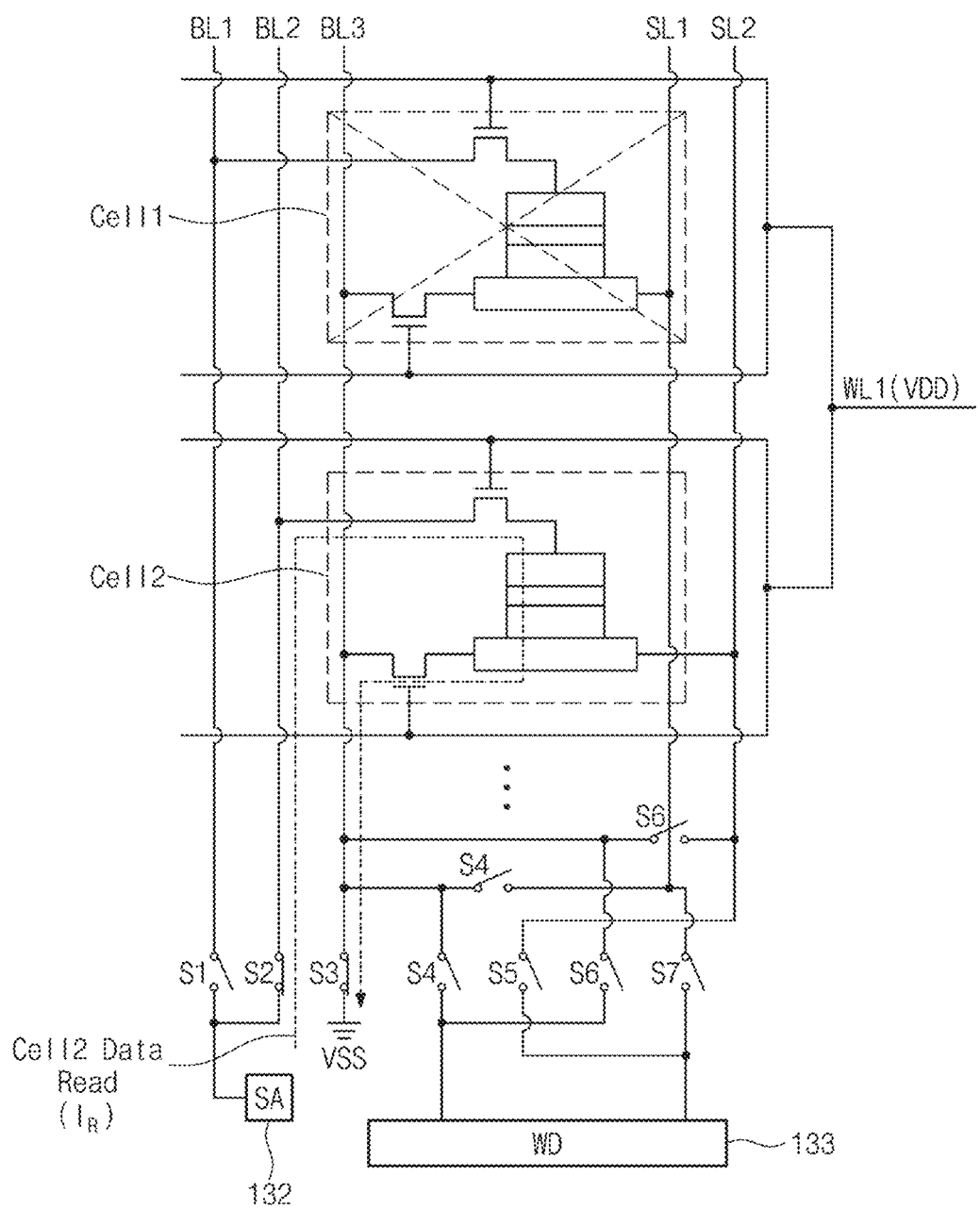

FIGS. 9A to 9C are diagrams for describing a data read operation associated with cells connected to one word line of FIG. 6, according to at least one embodiment of the present disclosure. At least one embodiment in which the data read operation is performed with respect to cells connected to the first word line WL1 among the plurality of word lines WL1 to WL$2^{n-1}$ will be described with reference to FIGS. 9A to 9C.

Referring to FIGS. 4A to 7 and 9A to 9C, in the data read operation of the first cell cell1 and the second cell cell2 connected to the first word line WL1, the power supply voltage VDD may be applied to the first word line WL1 through the first word line driver Drv1. Accordingly, the first word line WL1 among the plurality of word lines WL1 to WL$2^{n-1}$ may be activated. The drive circuit 120 may drive one word line WL1 among the plurality of word lines WL1 to WL$2^{n-1}$ based on the first input signals I(0) to I(n-2) received from the outside.

The first switch S1 may be turned on depending on the control signal of the first logic gate 131a, which is based on the second input signal I(n-1) having the first logical value (e.g., "1") and the read enable signal REN. In these cases, the sense amplifier 132 may be connected to the first bit line BL1.

The second switch S2 may be turned on depending on the control signal of the second logic gate 131b, which is based on the second input signal I(n-1) having the second logical value (e.g., "0") and the read enable signal REN. In this case, the sense amplifier 132 may be connected to the second bit line BL2. In FIGS. 9A and 9B, the write driver 133 may not be connected to the third bit line BL3 and the plurality of source lines SL1 and SL2.

The third switch S3 may be turned on depending on the control signal of the fifth logic gate 131e, which is based on the read enable signal REN. In this case, the third bit line BL3 may be connected to the ground terminal. The ground voltage VSS may be applied to the third bit line BL3.

When the power supply voltage VDD is applied to the first word line WL1, the read transistors of the first cell cell1 and the second cell cell2 may be turned on. In this case, the first bit line BL1 and the second bit line BL2 may be charged with the power supply voltage VDD.

Under the above voltage condition, the sense amplifier 132 may generate the read current $I_R$ to sense a voltage change of the first bit line BL1 connected to the first cell cell1 or a voltage change of the second bit line BL2 connected to the second cell cell2. The read current $I_R$ may flow from the first bit line BL1 to the third bit line BL3 or from the second bit line BL2 to the third bit line BL3.

The read current $I_R$ may flow through the MTJ and the heavy metal HM. The read current $I_R$ may flow through the MTJ in a direction (e.g., the fourth direction (refer to FIG. 2) perpendicular to the interface at which the heavy metal HM and the MTJ contact each other.

A resistance state (e.g., a high-resistance state or a low-resistance state) of the MTJ may be detected by the read current $I_R$. For example, when the magnetization direction of the free magnetic pattern FL is parallel to the magnetization direction of the reference magnetic pattern PL, the MTJ may be in a first resistance state (e.g., the low-resistance state). When the magnetization direction of the free magnetic pattern FL is anti-parallel to the magnetization direction of the reference magnetic pattern PL, the MTJ may be in a second resistance state (e.g., the high-resistance state). Data (e.g., "0" or "1") stored in the MTJ of the first cell cell1 or the second cell cell2 may be detected depending on the resistance state of the MTJ.

FIGS. 10A to 11C are diagrams for describing a data write operation associated with cells connected to one word line of FIG. 6, according to at least one embodiment of the present disclosure.

In at least one embodiment, an operation in which write data (e.g., "0") having a first value are written to cells connected to the first word line WL1 among the plurality of word lines WL1 to WL$2^{n-1}$ will be described with reference to FIGS. 10A to 10C.

In at least one embodiment, an operation in which write data (e.g., "1") having a second value are written to cells connected to the first word line WL1 among the plurality of word lines WL1 to WL$2^{n-1}$ will be described with reference to FIGS. 11A to 11C. The description that is the same (or substantially similar) as the description given with reference to FIGS. 9A to 9C is omitted.

Referring to FIGS. 6, 7, and 10A to 11C, when the power supply voltage VDD is applied to the first word line WL1, the write transistors of the first cell cell1 and the second cell cell2 may be turned on. In this case, the third bit line BL3 may be charged with the power supply voltage VDD.

The sixth and seventh switches S6 and S7 may be turned on depending on the control signal of the fourth logic gate 131d, which is based on the second input signal I(n-1) having the second logical value (e.g., "0") and the write enable signal WEN. In this case, the write driver 133 may be connected to the first end of the first source line SL1 through the seventh switch S7. The second end of the first source line SL1 may be connected to a source line driver (not illustrated) included in the peripheral circuit 130.

The fourth and fifth switches S4 and S5 may be turned on depending on the control signal of the third logic gate 131c, which is based on the second input signal I(n-1) having the first logical value (e.g., "1") and the write enable signal WEN. In this case, the write driver 133 may be connected to the first end of the second source line SL2 through the fifth switch S5. The second end of the second source line SL2 may be connected to the source line driver (not illustrated) included in the peripheral circuit 130.

Under control of the peripheral circuit 130, the source line driver (not illustrated) may drive the plurality of source lines SL1 and SL2 with a specific voltage level.

In the case of performing the write operation on the first cell cell1 and the second cell cell2 so as to have the high-resistance value (e.g., an anti-parallel state) (e.g., writing the write data having a first value (e.g., "0")) or in the case of performing the write operation on the first cell cell1 and the second cell cell2 so as to have the low-resistance value (e.g., a parallel state) (e.g., writing the write data having a second value (e.g., "1")), voltage levels that are applied from the source line driver (not illustrated) to the first source line SL1 and the second source line SL2 may be different from each other.

Figure 10A:
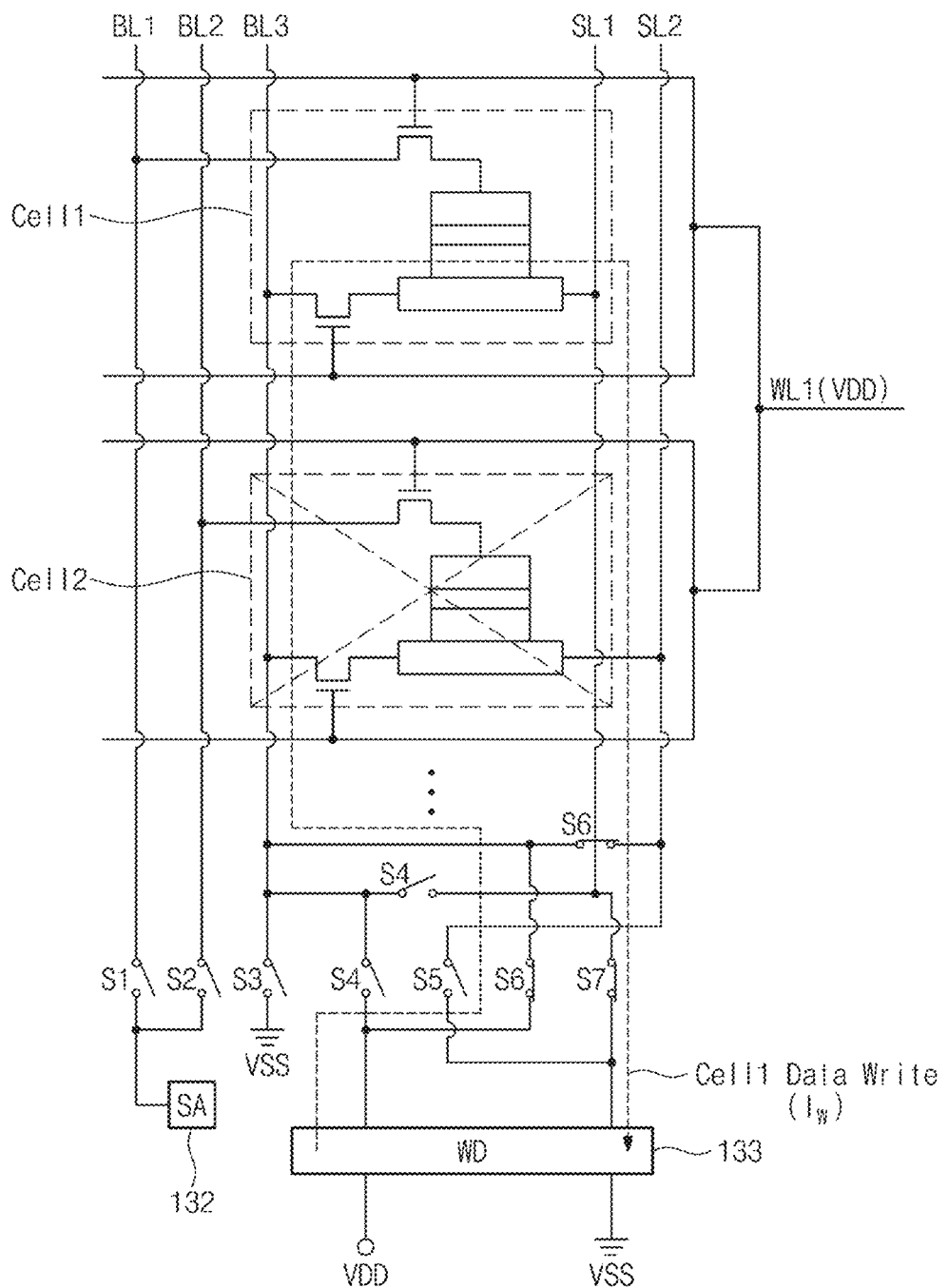
FIGS. 10A to 11C are diagrams for describing a data write operation associated with cells connected to one word line of FIG. 6, according to at least one embodiment of the present disclosure.
Figure 10B:
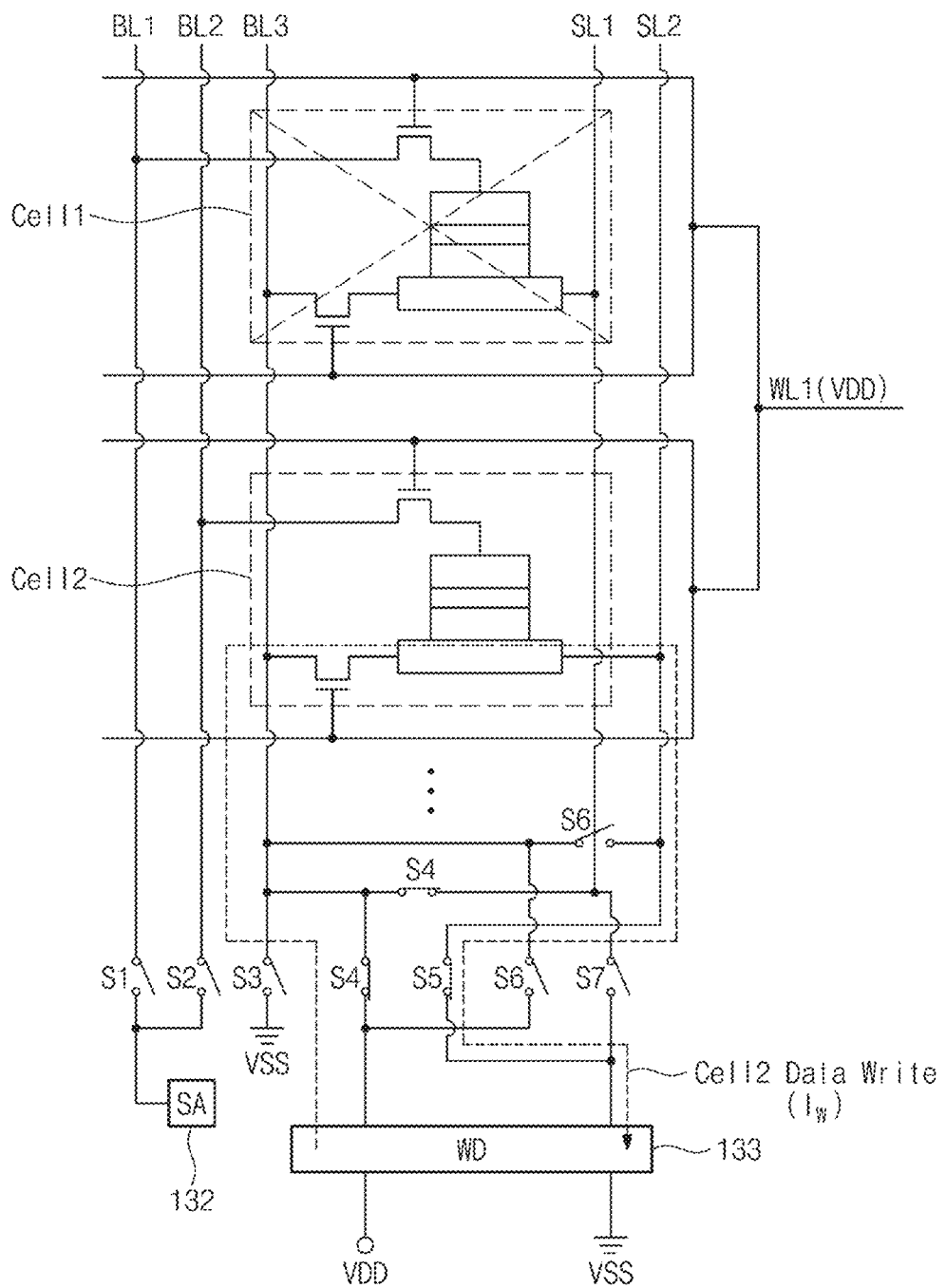

In FIGS. 10A to 10C, to write the write data (e.g., "0") having the first value to the first cell cell1, the ground voltage VSS may be applied to the first source line SL1, and the power supply voltage VDD may be applied to the second source line SL2.

When the sixth switch S6 is turned on, the first end of the second source line SL2 and the third bit line BL3 may be connected to the write driver 133. Accordingly, the third bit line BL3 may be maintained at the level of the power supply voltage VDD.

According to the above voltage condition, the write current $I_W$ may flow from the third bit line BL3 (having the level of the power supply voltage VDD) to the first source line SL1 (having the level of the ground voltage VSS) through the heavy metal HM; at the same (or substantially similar) time, the spin current may flow to the first bit line BL1 through the MTJ in a direction parallel to the reference magnetic pattern PL of the MTJ or in a direction anti-parallel to the reference magnetic pattern PL of the MTJ.

The write current $I_W$ may act as the in-plane current that applies the spin orbit torque to the free magnetic pattern FL. The write current $I_W$ may flow in parallel with the interface of the heavy metal HM and the free magnetic pattern FL of the MTJ and may flow to be adjacent to the interface. While the write current $I_W$ flows, the spin current (induced by the spin hall effect, Rashba effect, and/or the like) may flow in a direction perpendicular to the interface between the heavy metal HM and the free magnetic pattern FL of the MTJ, and thus, the spin orbit torque may be applied to the MTJ. Based on a magnitude of the write current $I_W$ induced along the surface of the heavy metal HM, the magnetization direction of the free magnetic pattern FL of the MTJ may be switched to be anti-parallel (or parallel) to the magnetization direction of the reference magnetic pattern PL.

To write the write data (e.g., "0") having the first value to the second cell cell2, the power supply voltage VDD may be applied to the first source line SL1, and the ground voltage VSS may be applied to the second source line SL2.

When the fourth switch S4 is turned on, the first end of the first source line SL1 and the third bit line BL3 may be connected to the write driver 133. Accordingly, the third bit line BL3 may be maintained at the level of the power supply voltage VDD.

According to the above voltage condition, the write current $I_W$ may flow from the third bit line BL3 (having the level of the power supply voltage VDD) to the second source line SL2 (having the level of the ground voltage VSS) through the heavy metal HM; at the same (or substantially similar) time, the spin current may flow to the second bit line BL2 through the MTJ in a direction parallel to the reference magnetic pattern PL of the MTJ or in a direction anti-parallel to the reference magnetic pattern PL of the MTJ.

Figure 11A:
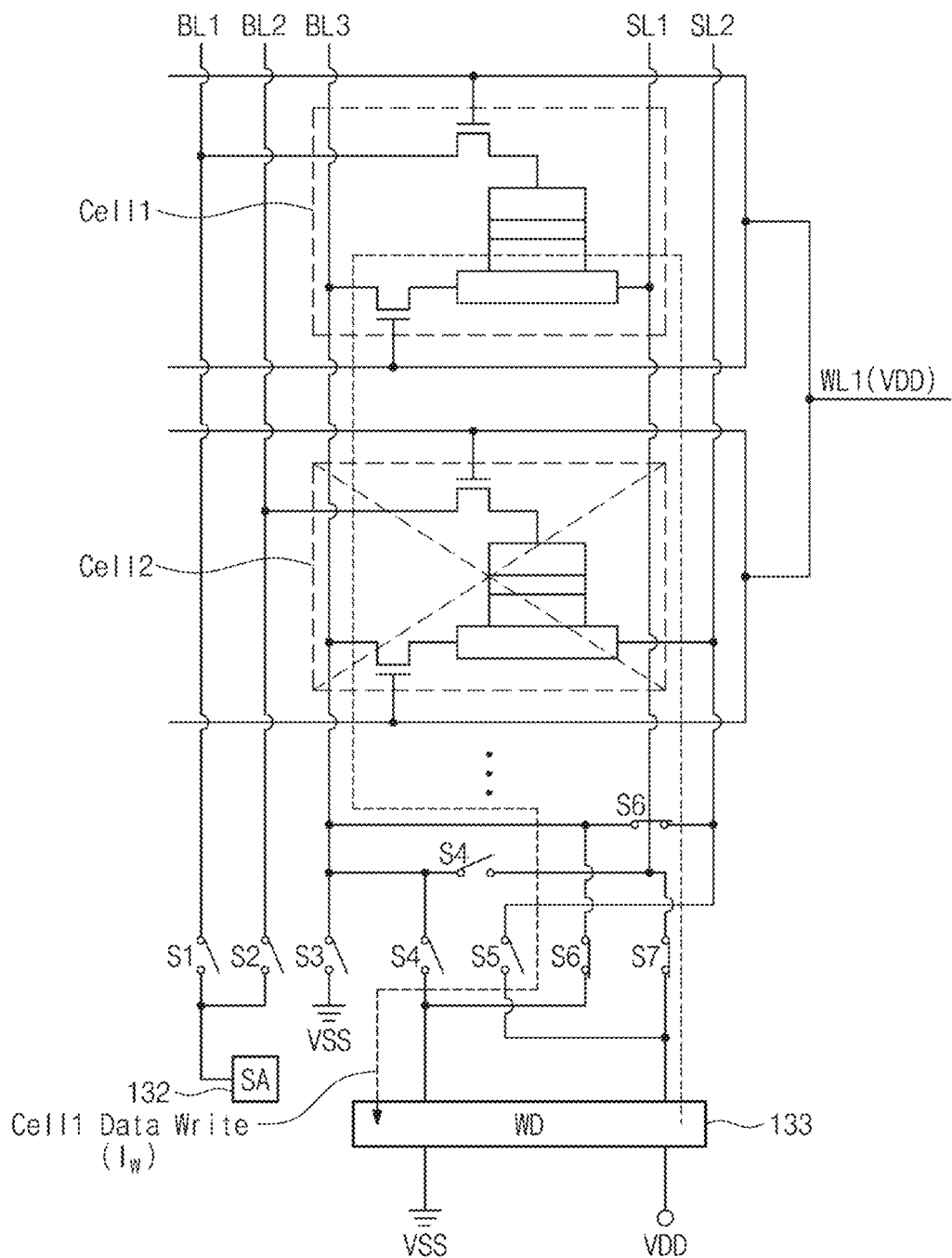
Figure 11B:
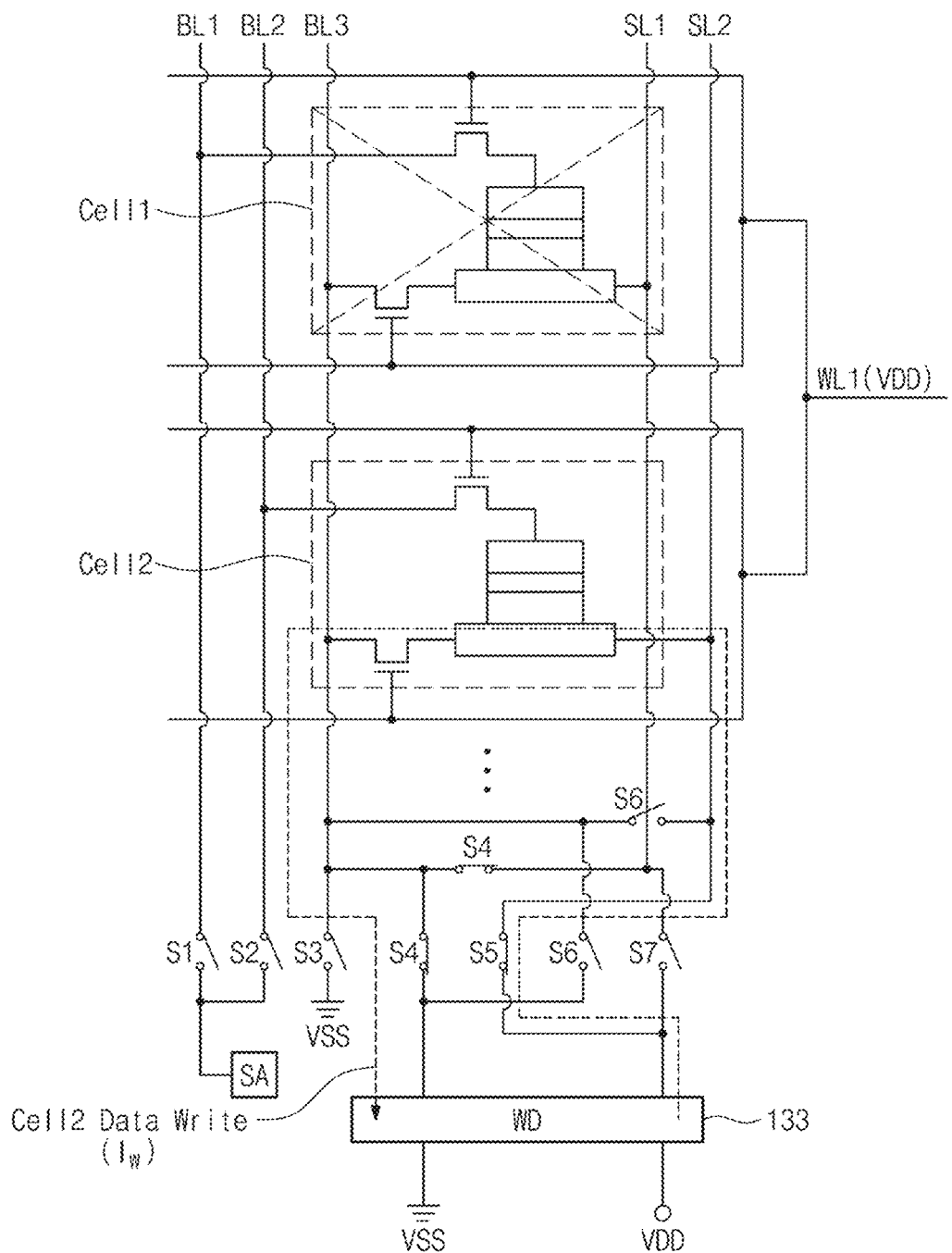

In FIGS. 11A to 11C, to write the write data (e.g., "1") having the second value to the first cell cell1, the power supply voltage VDD may be applied to the first source line SL1, and the ground voltage VSS may be applied to the second source line SL2.

When the sixth switch S6 is turned on, the first end of the second source line SL2 and the third bit line BL3 may be connected to the write driver 133. Accordingly, the third bit line BL3 may be discharged to the level of the ground voltage VSS.

According to the above voltage condition, the write current $I_W$ may flow from the source line SL1 (having the level of the power supply voltage VDD) to the third bit line BL3 (having the level of the ground voltage VSS) through the heavy metal HM; at the same (or substantially similar) time, the spin current may flow to the first bit line BL1 through the MTJ in a direction parallel to the reference magnetic pattern PL of the MTJ or in a direction anti-parallel to the reference magnetic pattern PL of the MTJ.

To write the write data (e.g., "1") having the second value to the second cell cell2, the ground voltage VSS may be applied to the first source line SL1, and the power supply voltage VDD may be applied to the second source line SL2.

When the fourth switch S4 is turned on, the first end of the first source line SL1 and the third bit line BL3 may be connected to the write driver 133. Accordingly, the third bit line BL3 may be maintained at the level of the ground voltage VSS.

According to the above voltage condition, the write current $I_W$ may flow from the second source line SL2 (having the level of the power supply voltage VDD) to the third bit line BL3 (having the level of the ground voltage VSS) through the heavy metal HM; at the same (or substantially similar) time, the spin current may flow to the second bit line BL2 through the MTJ in a direction parallel to the reference magnetic pattern PL of the MTJ or in a direction anti-parallel to the reference magnetic pattern PL of the MTJ.

Figure 12:
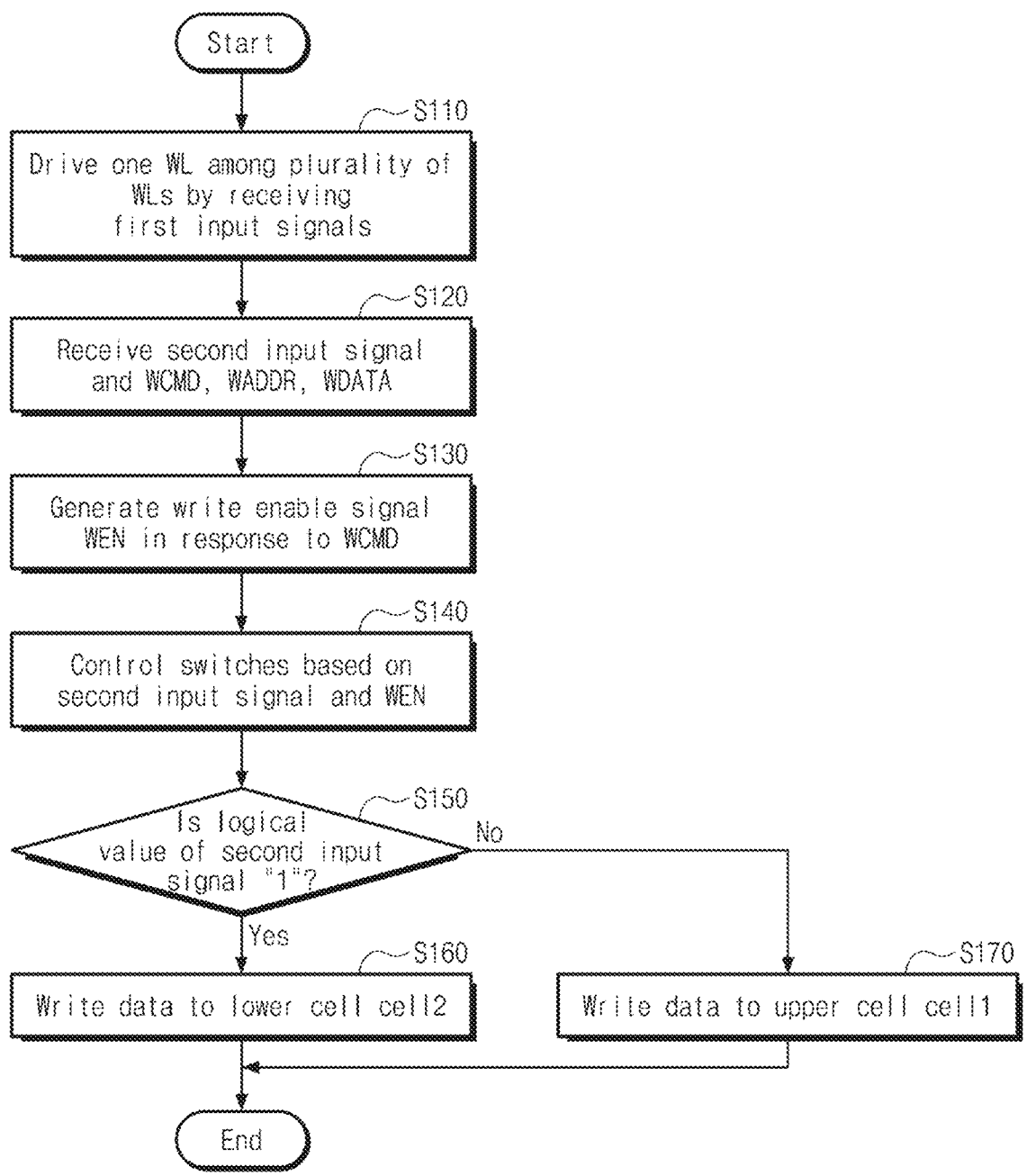
FIG. 12 is a flowchart of an operating method of the lookup table LUT performing a data write operation, according to at least one embodiment of the present disclosure.

FIG. 12 is a flowchart of an operating method of the lookup table LUT performing a data write operation, according to at least one embodiment of the present disclosure.

Referring to FIGS. 6, 7, 10A to 11C, and 12, in operation S110, the lookup table (LUT) 100 may drive one of a plurality of word lines based on first input signals.

In operation S120, the lookup table 100 may receive a second input signal, the write command WCMD, the write address WADDR, and the write data WDATA from the outside. Unlike the first input signals input to the drive circuit 120, the second input signal may be input to the peripheral circuit 130.

In operation S130, the lookup table 100 may generate the write enable signal WEN in response to the write command WCMD. The lookup table 100 may perform the data write operation based on the write enable signal WEN.

In operation S140, the lookup table 100 may control a plurality of switches based on the second input signal and the write enable signal WEN. When the write enable signal WEN is applied, the lookup table 100 may control the fourth to seventh switches S4 to S7.

When it is determined, in operation S150, that the logical value of the second input signal is "1", operation S160 may be performed. In operation S160, the lookup table 100 may write data "0" or "1" to a lower cell (i.e., the second cell cell2 in FIGS. 10A and 10B).

When it is determined, in operation S150, that the logical value of the second input signal is not "1", operation S170 may be performed. In operation S170, the lookup table 100 may write data "0" or "1" to an upper cell (i.e., the first cell cell1 in FIGS. 10A and 10B).

Figure 13:
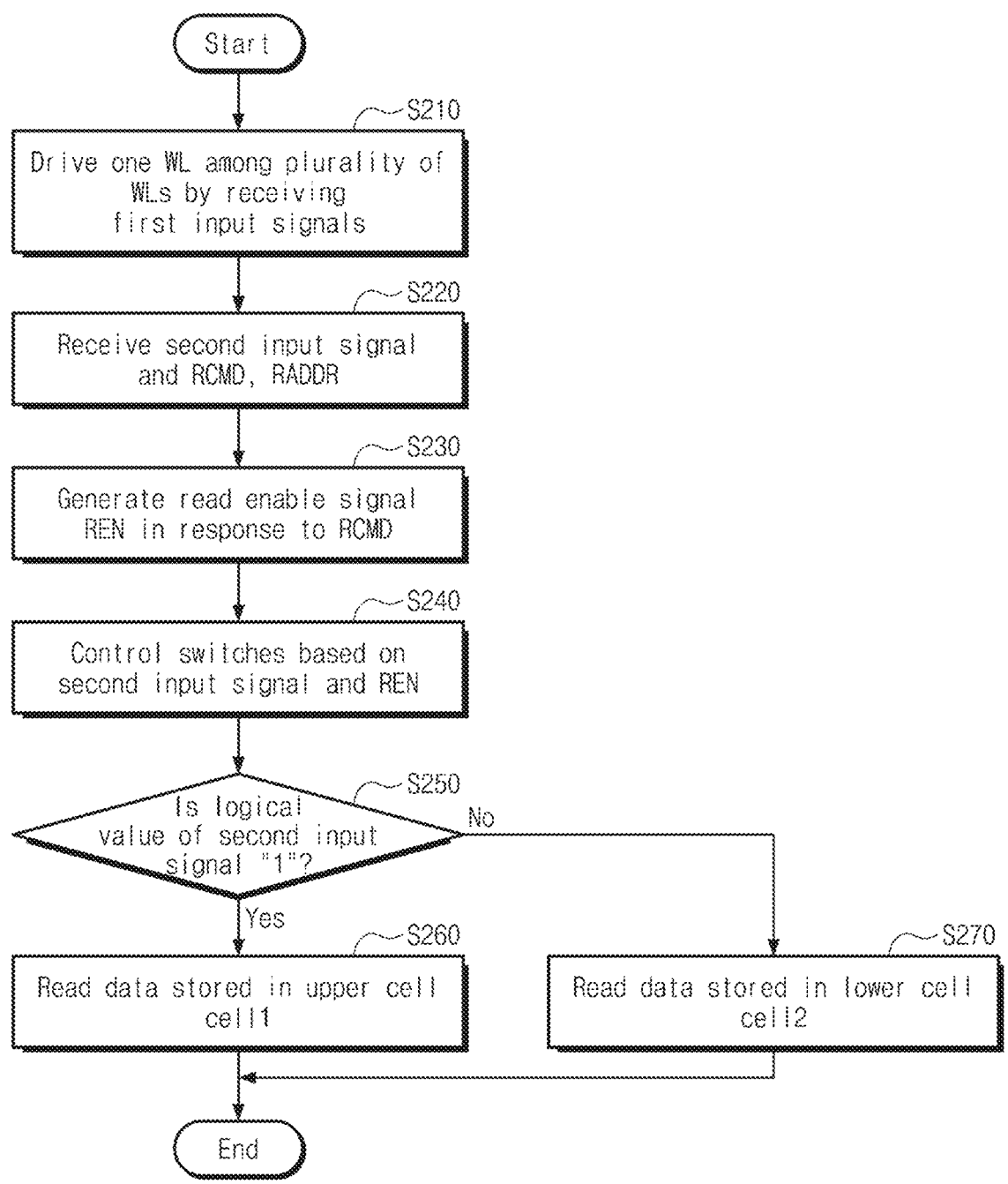
FIG. 13 is a flowchart of an operating method of the lookup table LUT performing a data read operation, according to at least one embodiment of the present disclosure.

FIG. 13 is a flowchart of an operating method of the lookup table LUT performing a data read operation, according to at least one embodiment of the present disclosure.

Referring to FIGS. 6, 7, 9A to 9C, and 12, in operation S210, the lookup table (LUT) 100 may drive one of a plurality of word lines based on first input signals.

In operation S220, the lookup table 100 may receive a second input signal, the read command RCMD, and the read address RADDR from the outside.

In operation S230, the lookup table 100 may generate the read enable signal REN in response to the read command RCMD. The lookup table 100 may perform the data read operation based on the read enable signal REN.

In operation S240, the lookup table 100 may control a plurality of switches based on the second input signal and the read enable signal REN. When the read enable signal REN is applied, the lookup table 100 may control the first to third switches S1 to S3.

When it is determined, in operation S250, that the logical value of the second input signal is "1", operation S260 may be performed. In operation S260, the lookup table 100 may read data "0" or "1" stored in an upper cell (i.e., the first cell cell1 in FIGS. 9A and 9B).

When it is determined, in operation S250, that the logical value of the second input signal is not "1", operation S270 may be performed. In operation S270, the lookup table 100 may read data "0" or "1" stored in a lower cell (i.e., the second cell cell2 in FIGS. 10A and 10B).

According to at least one embodiment of the present disclosure, a field programmable gate array (FPGA) device and an operating method thereof may provide a lookup table of the small area through a change of a design scheme of the lookup table. Also, as the design scheme of the lookup table is changed, the number of cells connected to one read bit line may decrease, and thus, the read energy and read time for the read operation of the FPGA may decrease.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A field programmable gate array device comprising:
a plurality of lookup tables each configured to store data, each of the plurality of lookup tables including
a cell array including a plurality of cells connected to a plurality of word lines,
a drive circuit connected to the cell array through the plurality of word lines and configured to drive at least a first word line, among the plurality of word lines, based on first input signals received from an external device, and
a peripheral circuit connected to the cell array through a plurality of bit lines and a plurality of source lines, and configured to control the drive circuit,
wherein the peripheral circuit is configured to
perform a data write operation on a first cell among cells connected to the first word line from among the plurality of cells, based on a first command and a second input signal received from the external device, and
perform a data read operation on the first cell among the cells connected to the first word line from among the plurality of cells, based on a second command and the second input signal received from the external device, and
wherein each of the cells connected to the first word line is connected to two of the plurality of bit lines and one of the plurality of source lines.

2. The field programmable gate array device of claim 1, wherein
the drive circuit includes a plurality of select circuits each including a plurality of transistors,
a number of the plurality of transistors is differently set for each of the plurality of select circuits,
the first input signals are respectively applied to the plurality of select circuits, and
in each of the plurality of select circuits, at least some of the plurality of transistors are turned on based on the first input signals.

3. The field programmable gate array device of claim 2, wherein, in each of the plurality of select circuits, the plurality of transistors is implemented with at least one of an N-type metal-oxide-semiconductor (NMOS) transistor, a p-type MOS (PMOS) transistor, or a high-electron mobility transistor (HEMT).

4. The field programmable gate array device of claim 1, wherein
the cells connected to the first word line includes the first cell and a second cell,
each of the first cell and the second cell includes a write transistor connected to the first word line and one of the plurality of bit lines,
a memory included in the first cell is connected to a first end of the write transistor included in the first cell and a first source line among the plurality of source lines, and
a memory included in the second cell is connected to a first end of the write transistor included in the second cell and a second source line different from the first source line from among the plurality of source lines.

5. The field programmable gate array device of claim 4, wherein each of the memories of the first and second cells includes a spin orbit torque-magnetic random access memory (SOT-MRAM).

6. The field programmable gate array device of claim 1, wherein
the cells connected to the first word line include the first cell and a second cell,
a read transistor included in the first cell is connected to the first word line and a first bit line among the plurality of bit lines, and
a read transistor included in the second cell is connected to the first word line and a second bit line different from the first bit line from among the plurality of bit lines.

7. The field programmable gate array device of claim 1, wherein the peripheral circuit includes:
a plurality of switches connected to the cell array through the plurality of bit lines and the plurality of source lines, and
a switch controller configured to control the plurality of switches.

8. The field programmable gate array device of claim 7, wherein the switch controller includes:
a first logic circuit configured to perform first logical operations on the second input signal and a write enable signal to output first control signals for controlling first switches among the plurality of switches, and
a second logic circuit configured to perform second logical operations on the second input signal and a read enable signal to output second control signals for controlling second switches among the plurality of switches, wherein the peripheral circuit is configured to generate the write enable signal in response to the first command and to generate the read enable signal in response to the second command.

9. The field programmable gate array device of claim 8, wherein each of the first logical operations and the second logical operations includes an AND operation.

10. The field programmable gate array device of claim 8, wherein
the cells connected to the first word line include the first cell and a second cell,
the peripheral circuit is configured to apply different voltages to the plurality of source lines based on the first input signals and the second input signal, and
the peripheral circuit is configured to perform the data read operation with respect to one of the first cell or the second cell based on the different voltages and the first control signals.

11. The field programmable gate array device of claim 10, wherein,
the peripheral circuit is configured to perform the data write operation with respect to the second cell based on a difference between the voltages applied to the plurality of source lines in response to the second input signal having a first logical value, and
the peripheral circuit is configured to perform the data write operation with respect to the first cell based on the difference between the voltages applied to the plurality of source lines in response to the second input signal having a second logical value.

12. The field programmable gate array device of claim 10, wherein, when the second input signal has a first logical value, the peripheral circuit, based on the second control signal, is configured to sense a voltage change of a bit line connected to the first cell from among the plurality of bit lines.

13. The field programmable gate array device of claim 10, wherein, when the second input signal has a second logical value, the peripheral circuit, based on the second control signal, is configured to sense a voltage change of a bit line connected to the second cell from among the plurality of bit lines.

14. An operating method of a field programmable gate array device which includes a cell array including a plurality of cells, a drive circuit connected to the cell array through a plurality of word lines, and a peripheral circuit connected to the cell array through a plurality of bit lines and a plurality of source lines and configured to control the drive circuit, the method comprising:
receiving, at the drive circuit, first input signals from an external device;
driving, at the drive circuit, a first word line, among the plurality of word lines, based on the first input signals;
receiving, at the peripheral circuit, a command, an address, and a second input signal from the external device; and
performing, at the peripheral circuit, a data read operation on a first cell, among cells connected to the first word line from among the plurality of cells, based on the command and the second input signal,
wherein each of the cells connected to the first word line is connected to two of the plurality of bit lines and one of the plurality of source lines.

15. The method of claim 14, wherein
the drive circuit includes a plurality of select circuits each including a plurality of transistors,
a number of the plurality of transistors is differently set for each of the plurality of select circuits, and
the driving of the first word line includes turning on, at the drive circuit, at least some of a plurality of switches based on the first input signals in response to the first input signals being respectively applied to the plurality of select circuits.

16. The method of claim 14, wherein the performing of the data read operation includes:
performing, at the peripheral circuit, logical operations on the second input signal and a read enable signal, and
sensing, at the peripheral circuit, a voltage change of one of the plurality of bit lines based on a result of the logical operations, and
wherein the read enable signal is generated by the peripheral circuit in response to the command.

17. The method of claim 16, wherein
the cells connected to the first word line include the first cell and a second cell,
wherein the performing of the data read operation includes
sensing, at the peripheral circuit, a voltage change of a bit line connected to the first cell from among the plurality of bit lines based on the result of the logical operations in response to the second input signal having a first logical value.

18. The method of claim 16, wherein
the cells connected to the first word line include the first cell and a second cell,
wherein the performing of the data read operation includes sensing, at the peripheral circuit, a voltage change of a bit line connected to the second cell from among the plurality of bit lines based on the result of the logical operations in response to the second input signal being a second logical value.

19. The method of claim 16, wherein each of the logical operations includes an AND operation.

20. An operating method of a field programmable gate array device which includes a cell array including a plurality of cells, a drive circuit connected to the cell array through a plurality of word lines, and a peripheral circuit connected to the cell array through a plurality of bit lines and a plurality of source lines and configured to control the drive circuit, the method comprising:
receiving, at the drive circuit, first input signals from an external device;
driving, at the drive circuit, a first word line among the plurality of word lines based on the first input signals;
receiving, at the peripheral circuit, a write command, a write address, write data, and a second input signal from the external device;
writing, at the peripheral circuit, the write data to a first cell among cells connected to the first word line from among the plurality of cells, based on the write command and the second input signal;
receiving, at the peripheral circuit, a read command, a read address, and the second input signal from the external device; and
reading, at the peripheral circuit, a second cell, among the cells connected to the first word line from among the plurality of cells, based on the read command and the second input signal,
wherein the writing of the write data includes
performing, at the peripheral circuit, first logical operations with respect to the second input signal and a write enable signal, applying, at the peripheral circuit, different voltages to the plurality of source lines based on the first input signals and the second input signal, and writing, at the peripheral circuit, the write data to the first cell of the plurality of cells based on the voltages and a result of the first logical operations, wherein the write enable signal is generated by the peripheral circuit in response to the write command, wherein the reading of the second cell among the cells connected to the first word line from among the plurality of cells includes performing, at the peripheral circuit, second logical operations with respect to the second input signal and the read command, and sensing, at the peripheral circuit, a voltage change of a bit line, which is connected to the second cell among the plurality of cells, from among the plurality of bit lines based on a result of the second logical operations, wherein the read enable signal is generated by the peripheral circuit in response to the read command, and wherein each of the cells connected to the first word line is connected to two of the plurality of bit lines and one of the plurality of source lines.

* * * * *